US011795866B2

(12) United States Patent
Powell et al.

(10) Patent No.: US 11,795,866 B2
(45) Date of Patent: Oct. 24, 2023

(54) RUGGEDIZED AND INTEGRATED HYBRID GENERATORS AND RELATED METHODS

(71) Applicant: Enginuity Power Systems, Inc., Alexandria, VA (US)

(72) Inventors: Gregory Powell, Rockville, MD (US); William Vincent Meyers, Jr., Sherwood Forest, MD (US); Philip Silvester Zoldack, Plymouth, MI (US); Nil Kanth Singh, Canton, MI (US); Lara K. Reyes, Alexandria, VA (US); Jay Subramanian, Farmington Hills, MI (US); Michael Ampela, Colonie, NY (US); James Warren, Alexandria, VA (US)

(*) Notice: Subject to any disclaimer, the term of this patent is extended or adjusted under 35 U.S.C. 154(b) by 70 days.

(21) Appl. No.: 17/696,834

(22) Filed: Mar. 16, 2022

(65) Prior Publication Data

US 2022/0349336 A1 Nov. 3, 2022

Related U.S. Application Data

(60) Provisional application No. 63/161,958, filed on Mar. 16, 2021.

(51) Int. Cl.
*F02B 19/12* (2006.01)
*H02K 7/18* (2006.01)
*F02B 19/08* (2006.01)
*F02B 63/04* (2006.01)

(52) U.S. Cl.
CPC .............. *F02B 19/12* (2013.01); *F02B 19/08* (2013.01); *F02B 63/044* (2013.01); *H02K 7/1815* (2013.01)

(58) Field of Classification Search
CPC ........ F02B 19/12; F02B 19/08; F02B 63/044; H02K 7/1815; Y02T 10/12
USPC .......... 123/53.3, 53.6, 55.2, 55.7, 73 C, 298, 123/145 R, 145 A, 179.5, 179.6; 290/40 B, 41, 40 R
See application file for complete search history.

(56) References Cited

FOREIGN PATENT DOCUMENTS

| CA | 2472800 | * | 1/2006 | .............. F01C 1/084 |
| WO | WO 2011092365 | * | 8/2011 | ............ F02B 19/108 |

* cited by examiner

*Primary Examiner* — Hai H Huynh
(74) *Attorney, Agent, or Firm* — CAPITOL PATENT & TRADEMARK LAW FIRM, PLLC

(57) ABSTRACT

Ruggedized generators can operate using both medium and heavy fuels and output at least 5 kWe of power, yet are quiet, compact in size, and reliable.

10 Claims, 18 Drawing Sheets

FRONT OF ENGINE

BACK OF ENGINE

SECTION A-A

36 — COOLING FINS — 36a

DIA 0.47 IN

RUGGEDIZED AND INTEGRATED HYBRID GENERATORS AND RELATED METHODS

RELATED APPLICATIONS

This application claims priority to U.S. Provisional Application 63/161,958 filed Mar. 16, 2021 (the "'958 Application"). This application also incorporates by reference the entire disclosures set forth in the '958 Application as well as the entire disclosures set forth in U.S. Non-Provisional application Ser. No. 17/151,253 (the "'253 Application").

TECHNICAL FIELD

This disclosure relates to the field of generators, and particularly, to a generator that incorporates an inwardly opposed piston engine (OPE) that can operate using one or more fuels (e.g., Jet Propulsion (JP) 8 fuel, NATO F-24 fuel, D2 fuel), for example.

INTRODUCTION

This section introduces aspects that may help facilitate a better understanding of the disclosure. Accordingly, the statements of this section are to be read in this light and are not to be understood as admissions about what is, or what is not, prior art.

To date, it has been challenging to produce a generator that can operate using both "medium" (gasoline) and "heavy" (diesel) fuels in order to produce at least 5 kilowatts (kW) of power. Existing internal combustion (IC) engines that may be used as a generator have difficulty burning heavy fuels. A further challenge is to produce a small generator (weight-wise and size-wise) that is capable of using both medium and heavy fuels. Typically, small existing IC engines run at high speeds and have very short power strokes making it difficult to efficiently operate such engines using heavy fuels.

Accordingly, it is desirable to provide a generator that can operate using both medium and heavy fuels that outputs at least 5 kWe of power, yet is quiet, small in size, and reliable.

SUMMARY

The inventors describe various exemplary, inventive systems that are compact in size and include generators capable of using both medium and heavy fuels while producing at least 5 kWe of power.

In one embodiment, an inventive compact and ruggedized system for producing power may comprise: a first generator; a second generator; and an engine connected to the first and second generators to provide energy to the first and second generators, where the engine may comprise one or more cylinders, where each cylinder may comprise, a long-reach spark plug for ignition and combustion close to a center of a combustion chamber of each cylinder, a glow plug, and at least one direct injector configured to inject fuel towards the glow plug and into the combustion chamber.

In such a system the first generator may output at least 5 kWe of power, and the engine may be an inwardly, opposed piston engine.

The system may further comprise a second direct injector configured to inject fuel towards into the combustion chamber and towards the spark plug, wherein the fuel injected by the at least one injector and the second injector may generate tumbling fuel about a center axis of each cylinder.

A second exemplary compact and ruggedized system for producing power may comprise: a first generator; a second generator; and an engine connected to the first and second generators to provide energy to the first and second generators, where the engine may comprise one or more cylinders, where each cylinder may comprise, at least one direct injector configured to inject fuel towards a glow plug and towards a pre-chamber, the pre-chamber configured to receive at least one spark plug for igniting the fuel from the direct injector, and a glow plug for igniting fuel from the direct injector.

Similar to before, the first generator of this system may also be configured to output at least 5 kWe of power, for example and the engine may be an inwardly, opposed piston engine.

Still further, the inventors provide additional inventive compact and ruggedized systems for producing power. One such additional system may comprise: a first generator; a second generator; and an engine connected to the first and second generators to provide energy to the first and second generators, the engine may comprise one or more cylinders, where each cylinder may comprise, a pre-chamber configured to receive a direct injector configured to inject fuel into the pre-chamber and further configured to receive at least one spark plug for igniting the fuel from the direct injector in the pre-chamber and creating a heated turbulent flow out of the pre-chamber and into the combustion chamber of the cylinder to ignite fuel in the combustion chamber, and a glow plug for igniting fuel from the direct injector.

Again, similar to before, the first generator of this system may also be configured to output at least 5 kWe of power, for example, and the engine may be an inwardly, opposed piston engine.

The inventive systems (and corresponding methods) described above are just some of the inventive systems and methods that will be apparent from the discussion herein.

BRIEF DESCRIPTION OF THE DRAWINGS

The present invention is illustrated by way of example and is not limited by the accompanying figures in which like reference numerals indicate similar elements and in which.

Figure 1:
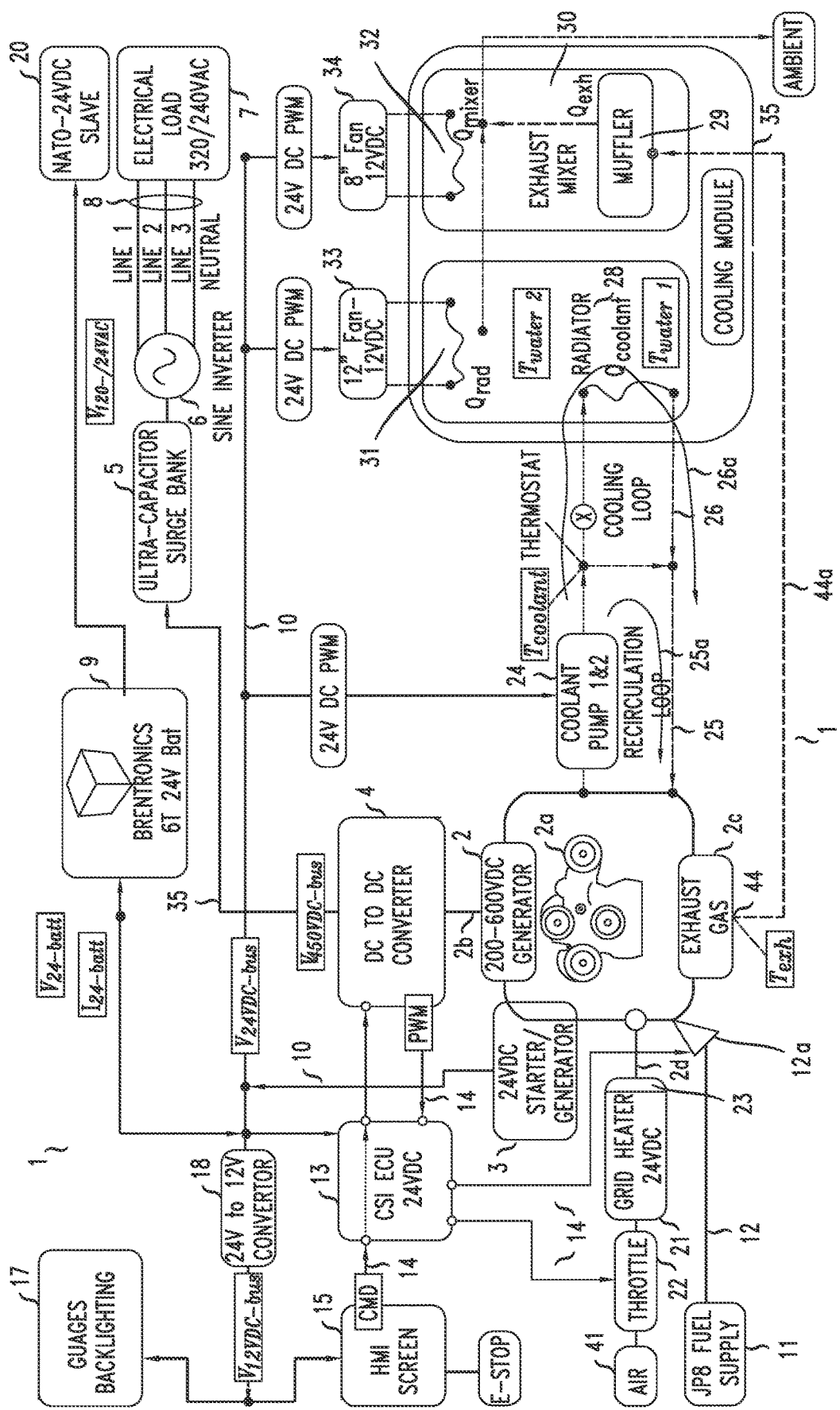
FIG. 1 depicts a simplified block diagram of a system for providing power according to one embodiment of the present disclosure.

Specific embodiments of the present invention are disclosed below with reference to various figures and sketches. Both the description and the illustrations have been drafted with the intent to enhance understanding. For example, the dimensions of some of the elements in the figures may be exaggerated relative to other elements, and well-known elements that are beneficial or even necessary to a commercially successful implementation may not be depicted so that a less obstructed and a more clear presentation of embodiments may be achieved.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

DETAILED DESCRIPTION OF EXEMPLARY EMBODIMENTS

The detailed description that follows describes exemplary embodiments and is not intended to be limited to the expressly disclosed combination(s). Therefore, unless otherwise noted, features disclosed herein may be combined together to form additional combinations that were not otherwise shown for purposes of brevity.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

As used herein and in the appended claims, the term "comprises," "comprising," or variations thereof are intended to refer to a non-exclusive inclusion, such that a process, method, article of manufacture, or apparatus (e.g., a generator) that comprises a list of elements does not include only those elements in the list, but may include other elements not expressly listed or inherent to such process, method, article of manufacture, or apparatus.

The terms "a" or "an", as used herein, are defined as one, or more than one. The term "plurality", as used herein, is defined as two, or more than two. The term "another", as used herein, is defined as at least a second or more.

Unless otherwise indicated herein, the use of relational terms, if any, such as "first" and "second", "top" and "bottom", "back" and "front", and "left" and "right" and the like are used solely to distinguish one view, entity or action from another view, entity or action without necessarily requiring or implying any actual such relationship, order or importance between such views, entities or actions.

The terms "including" and/or "having", as used herein, are defined as comprising (i.e., open language).

As used herein "x-axis" or "first axis", "y-axis" or "second axis" and "z-axis" or "third axis" mean three different geometric directions and planes. Typically, the x-axis is used to indicate motion in a horizontal direction/plane, the y-axis is used to indicate motion in the vertical direction/plane and the z-axis is used to indicate motion in an axis that is perpendicular to both the x and y axes. However, depending on the orientation and supporting structure of an OPE and the origin of the three axes may be interchangeable.

As used herein the phrase "operable to" means "functions to" unless the context or knowledge of one skilled in the art indicates otherwise.

To the extent any dimension, weight, size, percentages or operating parameters are described herein or shown in the figures (collectively 'parameters"), it should be understood that such parameters are non-limiting and merely exemplary to allow those skilled in the art to understand the inventive embodiments described herein.

Similar reference numbers may denote similar components and/or features throughout the attached drawings.

Referring to FIG. 1 there is depicted a simplified block diagram of a system 1 for producing power of at least 5 kWe that includes first and second generators 2, 3 and a control system. In embodiments, the system 1 may be compact in size. For example, system 1 may replace three existing MIL SPEC generator systems. In an embodiment, the overall weight of system 1 may be at least 40% less than the weight of the existing systems. For example, an existing system may weigh 740 lbs. or more while an inventive, exemplary system 1 may weigh less than 400 pounds (e.g., 375 to 400 lbs).

In an embodiment, the control system may comprise an electronic control unit ("ECU") 13 and control and data bus 14 ("control bus"), for example, to name just two of the components making up an exemplary control system.

The engine 2a may be connected to the first and second generators 2, 3 to provide energy to the first and second generators 2, 3. The engine 2a may be an OPE engine described in more detail herein. In an embodiment, the first generator 2 may be configured and operable to output at least 5 kWe of power during both "cold" and "hot" start conditions and provide such power at a wide array of voltages (e.g., 200 to 600 Volts DC (VDC), such as 450 VDC) that can be used to power a wide array of electrical loads 7 (e.g., loads have load following capability from 2 kW to 5 kW) via distribution, electrical power bus 35 ("distribution bus").

In more detail, in an embodiment, upon generating an amount of power, the generator 2 may first output such power to a DC-to-DC power converter and conditioner 4 that is configured and operable to receive such power from the generator 2 at one or more input voltages (e.g., 200 VDC to 600 VDC), convert the input voltage(s) to one or more lower output voltages (e.g., 450 VDC) and then output power at the one or more lower voltages to an electrical protection module 5, electrical power inverter 6 and finally to one or more electrical loads 7 via distribution bus 35 and electrical load connections 8. In embodiments, the inverter 6 may be configured and operable to receive direct current (DC) power from the converter 4 at one or more DC voltages (VDC), convert the DC voltages into or more alternating current voltages (VAC, e.g., 120 VAC, 240 VAC), for example, and output and supply such AC power at the one or more AC voltages to one or more loads 7 via connections 8.

In an embodiment, the electrical protection module 5 may comprise one or more electrical or electronic capacitors or capacitive components, for example, configured to absorb energy from voltages and currents produced by the loads 7 that exceed the safe, operating capacity of the generator 2 and converter 4 (e.g., voltage spikes, short-circuit loads) thereby protecting the generator 2 and converter 4 from such unsafe voltages and currents.

FIG. 1 also depicts an exemplary DC battery 9 as a part of system 1. In embodiments, the battery 9 may be operable to generate and output (sometimes collectively referred to as "supply") power at one or more DC voltages (e.g., 12 VDC 24 VDC) to the second generator 3 (e.g., DC powered, electrical generator) and to one or more additional components of system 1, such as ECU 13, via system power bus 10 ("system bus"). In embodiments, the second generator may be optionally operable to function as an electrical or electronic starter or alternator, thus eliminating the need for a conventional starter motor, starter ring gear, and associated wiring, for example.

In more detail, as required to start the engine of the generator 2, the battery 9 may be operable to supply power at one or more DC voltages (e.g., 12 VDC 24 VDC) to the starter 3 (or second generator) via system bus 10. Upon receiving such power from the battery 9 the starter 3 may be configured and operable to supply power to the ignition subsystem of the engine 2a of the generator 2 at a suitable voltage and current to initiate combustion and start the generator 2.

As shown the battery 9 may also supply power to (i) one or more fans 33, 34 that are used as a part of a cooling module 35, (ii) one or more pumps 24 configured and operable to move coolant used to control the temperature of the generator 2 (e.g., cool the engine of the generator), (iii) one or more component DC-to-DC converters 18 that are configured and operable to convert one or more input DC voltages (e.g., 24 VDC) from the battery 9 to one or more output DC voltages (e.g., 12 VDC) and supply power at the one or more output DC voltages to one or more system indicators, such as lights, gauges 17 and/or user interface and display 15 (collectively "user interface"), and (iv) to the control unit 13.

Additionally, the generator 2 and battery 9 may supply power to batteries and components of an additional system 20 (e.g., a NATO 24 VDC "slave" system) via additional power bus 19 (e.g., a NATO style battery connection bus meeting MIL-PRF-62122 REF C) for example.

To provide a user with the capability to control both systems 1, 20 the inventors include a paralleling capability. In more detail, the control unit 13 may be connected to a control unit (not shown) of the second system 20 via a communication (not shown, e.g., a CAN-BUS communication bus) to allow the two systems 1, 20 to exchange communication signals to, among other things, control and/or synchronize the generator 2 of system 1 with a generator of the second system 20 or with additional batteries (not shown).

The control unit 13 may be operable to send and receive electrical and electronic control signals and/or data to and from one or more components of the system 1 via control bus 14. For example, the control unit 13 may receive signals representing instructions from the user interface 15 (e.g., LCD display) in order to control the operation of the generator 2 using one or more redundant pathways as well as controlling other components of system 1, such as (a) the engine throttle 22 which is configured and operable to regulate the amount of air that is input into the engine 2a of the generator 2, (b) one or more ports 12a that may input one or more types of diesel fuel 11 into the engine 2a via fuel supply line 12, (c) the DC-to DC converter 4 and (d) cooling fans 33, 34 to name just some of the components of system 1 that may be controlled by the control unit 13. It should be understood that such control may be initiated by receipt of instructions from a user via user interface 15 and control bus 14, and/or, by electronic instructions stored as signals and data within control unit 13 (e.g., artificial intelligence control algorithms). That is to say, control of components of system 1 by control unit 13 may be initiated by receipt of instructions at control unit 13 from user interface 15 in real-time or may be initiated by control 13 by accessing stored instructions in its memory, for example.

In addition to the control unit 13, the system 1 may include one or more mechanical switches (e.g., "ON" of "OFF" switches) that may be electrically connected to one or more components of the system to redundantly control the operation of the system and/or as a master control override. The control unit 13 may include a wiring harness that includes a plurality of electrical wires configured in a 2-point wiring method thereby eliminating electrical/mechanical junctions or welds in the harness for redundancy and durability (i.e., ruggedness).

To further increase the ruggedness of the system 1, the control unit 13 may be encased in a conductive aluminum housing that is grounded to the engine's 2a chassis to provide an added layer of protection against unwanted electromagnetic interference (EMI). Still further, microelectronics and electronics (e.g., electronic processors) on printed circuit boards within the control unit 13 may be encapsulated in a silicone material within the enclosure for enhanced vibration isolation.

Figure 14A:
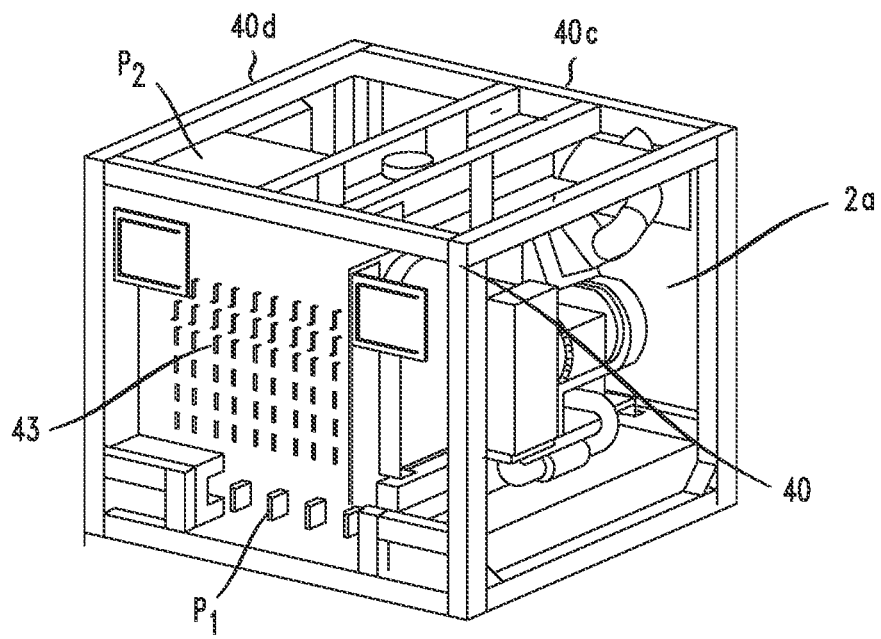
FIGS. 14A to 14C depict views of exemplary components of an exemplary, ruggedized enclosure according to embodiments of the present disclosure.
Figure 14B:
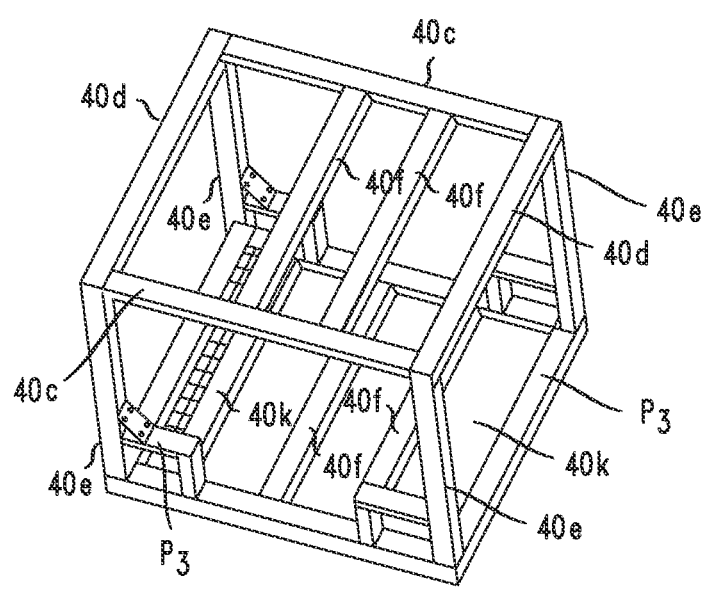
Figure 14C:
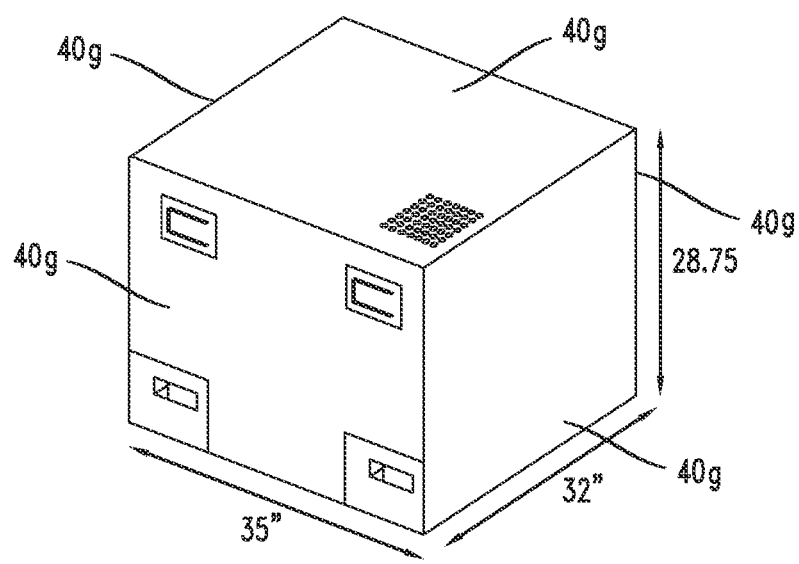

Referring now to FIGS. 14A to 14C, there are depicted views of exemplary components of an exemplary, ruggedized enclosure 40. FIGS. 14a and 14B depicts a ruggedized frame that includes horizontal and vertical perimeter beams 40c, 40d, 40e and additional transverse support beams 40f that may be configured and positioned to support one or more high-strength, yet lightweight protective panels 40g (e.g., carbon fiver panels) shown in FIG. 14C. In embodiments, the frame and panels 40g of the enclosure 40 may be configured to provide protection to components of system 1 within the enclosure 40 from vibratory and other unwanted forces or electrical signals. Optionally, the panels 40g and beams 40c, 40d, 40e may be configured, and composed of a material to provide protection against undesirable electromagnetic interference (EMI) (e.g., one or more EMI protective mesh layers) and/or the system 1 may include one or more EMI snubber circuits.

FIG. 14A also depicts exemplary positions $p_1$, $p_2$ within the ruggedized enclosure where the power electronics 43 (e.g., DC-to-DC power converter and conditioner 4, DC to AC inverter 6) may be positioned depending on the volume required by such components 43 and the available space (volume) within enclosure 40 while FIG. 14B depicts exemplary positions within frame that may receive one or more sound attenuating and/or absorbing layers. In an embodiment the one or more layers of the sound attenuating and/or absorbing layers may be composed on a melamine foam, for example, that may have an exemplary thickness of 2 inches, for example. Still further, such a configuration may provide sound and noise attenuation to a level of 1.0 NRC (noise reduction coefficient) at 500 Hertz as part of an overall sound attenuation subsystem.

Figure 14E:
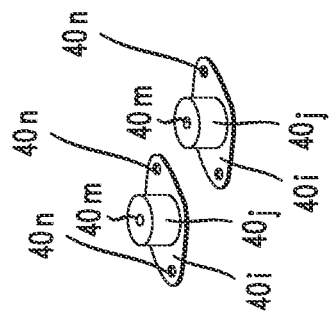
FIGS. 14D to 14F depict views of exemplary engine mounting structures according to embodiments of the present disclosure.
Figure 14F:
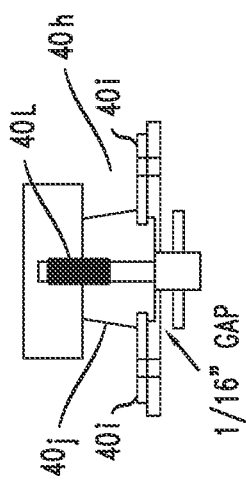
Figure 14D:
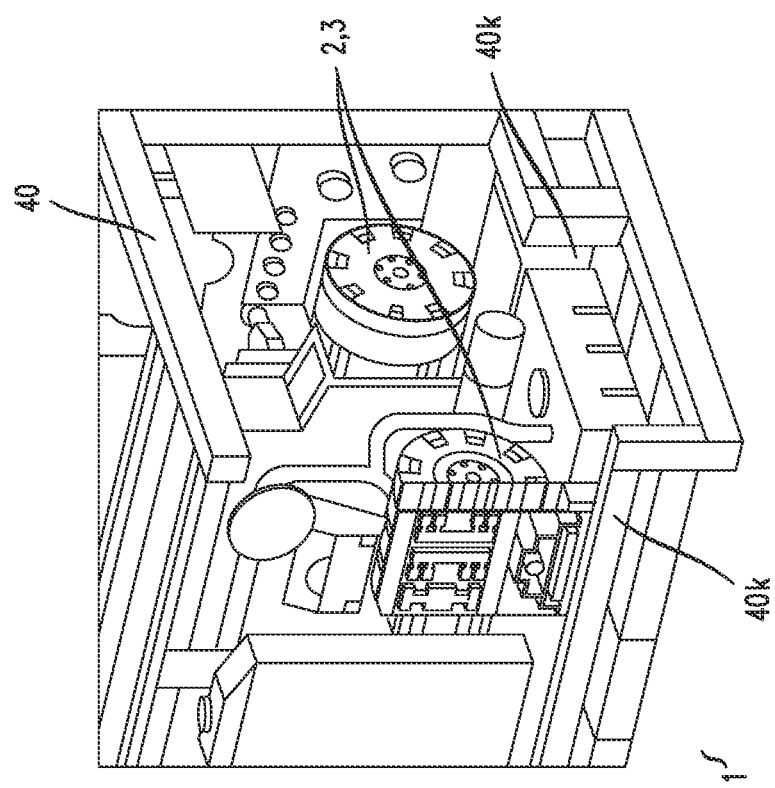

FIGS. 14D to 14F depict views of additional features of a sound attenuation subsystem. In more detail, there is shown an exemplary engine mounting structure 40h positioned within the enclosure 40. Though only a single structure 40h is shown, it should be understood that the system may include a plurality of such structures 40h.

Each such structure 40h may be operable to support components of the system 1, including the engine 2 and generators 2, 3. In an embodiment, the structure 40h may comprise a washer 40j (e.g., snubbing washer) connected to a plate 40i (see FIGS. 14E and 14F). The combination of washer and plate may be fastened to the enclosure using fasteners (e.g., screws, welds, etc.) received within openings 40n (see FIG. 14F) of the plate 40i. To connect and support the system 1, one end of one or more support stubs 401 may be received into each opening 40m of the washer 40n while a second end of the stub 40i may be received into an opening in base 40k of the frame that supports the system 1. In embodiments, it is believed that such structures provide an axial stiffness of 450 lbs./inch and a radial stiffness of 75 lb./inch. Accordingly, it is believed that such structures 40h provide a degree of ruggedized stability to the system 1 which, in turn, reduces the chances that components of system 1 may move or vibrate during operation, thus aiding in the reduction of unwanted noise and sounds from system 1.

Referring back to FIG. 1, the system 1 may also include a intake air charge heater 21 (e.g., grid heater) that is configured and operable to pre-heat an amount of atmospheric air that flows through and/or over the heater 21 where the amount may be determined and provided by the throttle 22 based on control signals from the control unit 13, for example, particularly, during the initial start-up of the engine 2a. Heater 21 may be operable to output the pre-heated air via a manifold 23 to valves that are positioned on a cylinder of the engine 2a of the generator 2 (valves not shown in FIG. 1) so that the air may be fed to a combustion chamber of the engine 2a. In an embodiment, the heater 21 may pre-heat the air to a minimum of 100° F. above ambient, for example.

Figure 2:
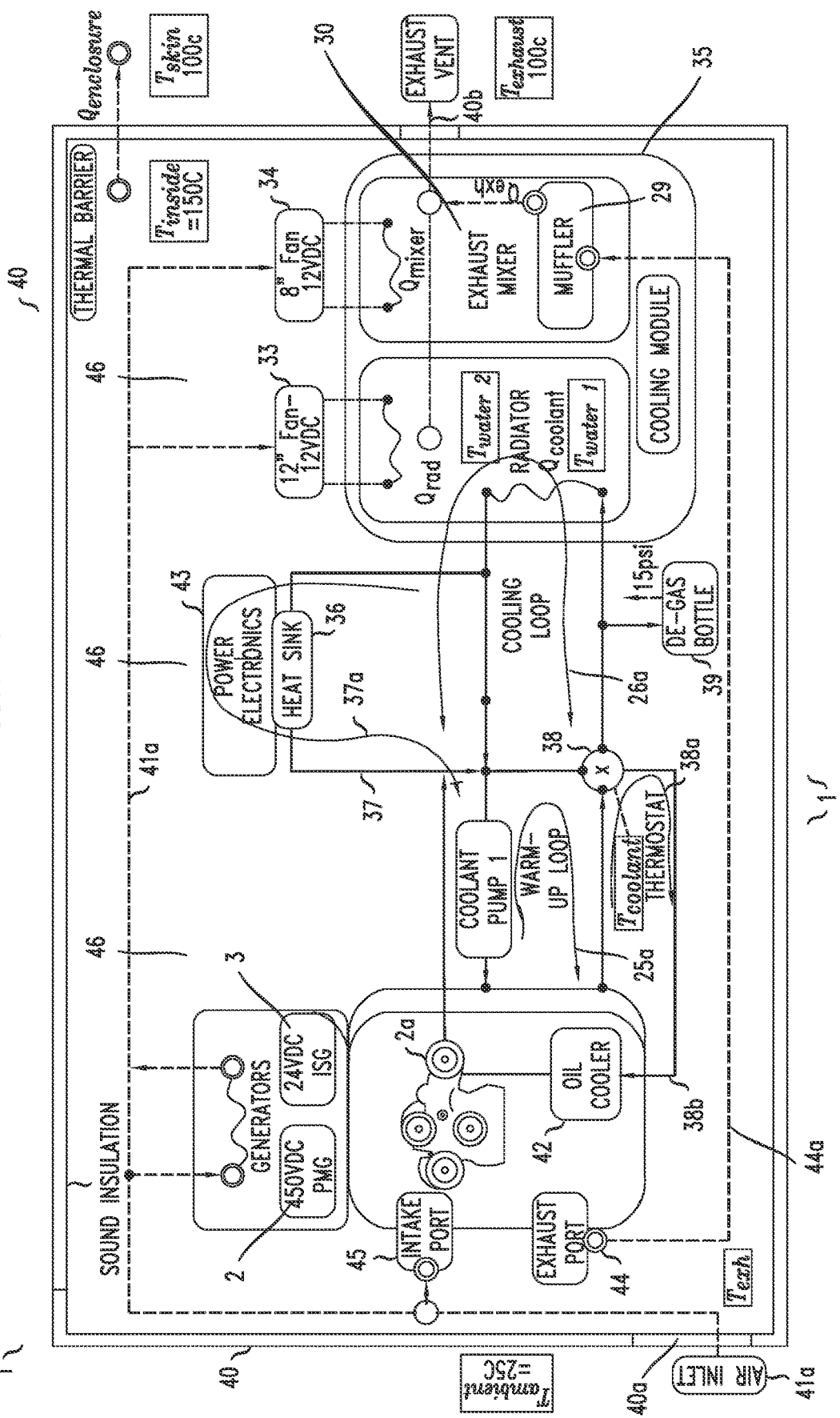
FIG. 2 depicts a simplified block diagram of an exemplary thermal management system according to one embodiment of the present disclosure.

To control the temperature of components of the system 1, the system 1 may include a thermal management subsystem. In an embodiment, the subsystem may include one or more pumps 24, piping 25, 26, fans 33, 34 and cooling module 35. Further, as shown in FIG. 2, the subsystem may also comprise a thermal transfer structure 36 (e.g., a heat sink), additional piping 37, one or more thermostat mechanisms 38, a de-gassing tank 39, fans 33, 34 and air flow 41a. In one embodiment, the cooling module 35 may include a plurality of chambers or structures, such as a radiator 28 and a separate muffler 29 and exhaust mixing chamber 30.

In an embodiment the degassing tank 39 may comprise a reservoir for holding the liquid coolant and a vent to allow gases entrapped in the coolant to be vented or expelled from the coolant. The degassing tank 39 may typically be configured and operable to maintain a pressure of about 15 PSI so that the coolant circulates through the degassing tank 39 and cooling loops.

The thermal management subsystem may operate using one or more different circulation loops. For example a first loop 25a may be a "warm-up' loop, a second loop may be a "cooling loop" 26a, a third loop may be an oil cooling loop 38a and a fourth loop may be a component thermal transfer loop 37a, for example.

In an embodiment, the first loop 25a may operate as follows. Upon start-up of the engine 2a of the generator 2 the one or more thermostat mechanisms 38 may be operable to detect the temperature of a liquid, engine coolant and remain in an initial state (e.g., a "closed" position). In more detail, the one or more thermostat mechanisms may comprise a temperature sensor for detecting the temperature of the coolant and one or more multi-positional valves. When the engine 2a is starting the temperature of the coolant is typically low and thus, the temperature detected by the sensor is typically below a first threshold that would trigger a change in the state of the valve. Accordingly the valve may remain in an initial state (e.g., again, a closed position). Accordingly, coolant within piping 25 may circulate within loop 25a under pressure from pumps 24.

In an embodiment, the second loop 26a ("cooling loop") may operate as follows. After the engine 2a has started up and has been operating the temperature of the coolant may be begin to rise, and thus, the temperature detected by the sensor of the thermostat mechanism 38 may typically reach and exceed the first threshold that triggers a change in the state of the valve of the thermostat mechanism 38. Accordingly the valve may move from an initial state to an adjusted state (e.g., an open position) that allows coolant to flow through piping 25 and piping 26. Accordingly, heated coolant within piping 25, 26 may circulate within loop 26a. In more detail, heated coolant from the engine may pass through radiator 28. In an embodiment, fan (or fans) 33 may be operable to force air 41a that is flowing over the radiator 28 containing the heated coolant to cool the coolant by reducing its temperature. To control the operation of the fans 33, the thermal management system may include another temperature sensor 31 (see FIG. 1). In one embodiment, when the sensor 31 (e.g., thermostat, thermocouple) detects that the temperature of the coolant has met and/or exceeded a second threshold (which may or may not be the same as the first threshold) the sensor 31 sends a signal to the fans 33 to turn on and force air 41a through the radiator to cool the coolant. The now cooled coolant continues to flow through piping 26, 25 and pumps 24 where it is forced back to the engine 2a.

In an embodiment, the third loop 38a ("oil cooling loop") may operate as follows. During start-up, and/or after the engine 2a has started up and has been operating it may be necessary to cool or warm the oil that is being used to lubricate the engine 2a. In an embodiment the oil may be stored in an oil chamber 42. Accordingly, after the engine 2a has started up and has been operating the temperature of the coolant may be begin to rise, and thus, the temperature detected by the temperature sensor of the thermostat mechanism 38 may typically reach and exceed the first threshold that triggers a change in the state of the valve of the thermostat mechanism 38. Accordingly the valve may move from an initial state to an adjusted state (e.g., an open position) that allows coolant to flow through piping 38b, 25 and 26. Thus, heated coolant within piping 25, 26 and 38 may circulate within loop 38a.

In an embodiment, the fourth loop 37a ("component thermal transfer loop") may operate as follows. Similar to the second loop, after the engine 2a has started up and has been operating the temperature of the coolant may be begin to rise, and thus, the temperature detected by the temperature sensor of the thermostat mechanism 38 may typically reach and exceed the first threshold that triggers a change in the state of the valve of the thermostat mechanism 38. Accordingly the valve may move from an initial state to an adjusted state (e.g., an open position) that allows coolant to flow through piping 25 and piping 26 towards radiator 28. In more detail, heated coolant from the engine may pass through radiator 28 and be cooled as described previously. In addition, rather than just return to the engine 2a some of the now cooled coolant may pass through piping 37 and be directed towards the thermal transfer structure 36 (e.g., a heat sink), the configuration of which is set forth in more detail elsewhere herein. The cooled coolant absorbs heat from the structure 36 that originates with the operation of electronic components 43 (e.g., DC-to-DC converter 4, DC-to-AC inverter 6, and/or liquid cooled alternators) and carries the absorbed heat in the coolant that flows through piping 37, 25 and 26 and eventually back to the radiator 28 to be cooled once again.

Figure 15A:
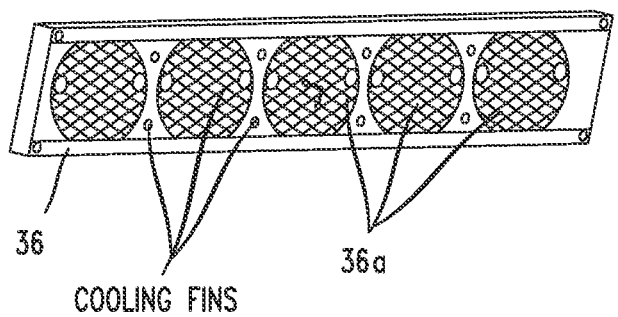
FIGS. 15A to 15C depict views of a thermal transfer structure (e.g., a heat sink) according to embodiments of the present disclosure.
Figure 15B:
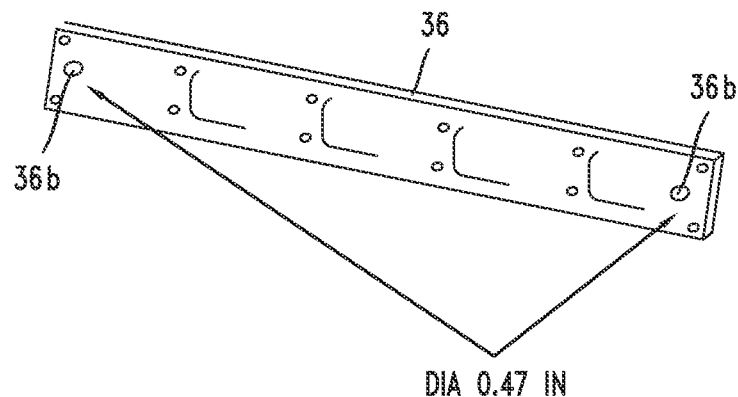
Figure 15C:
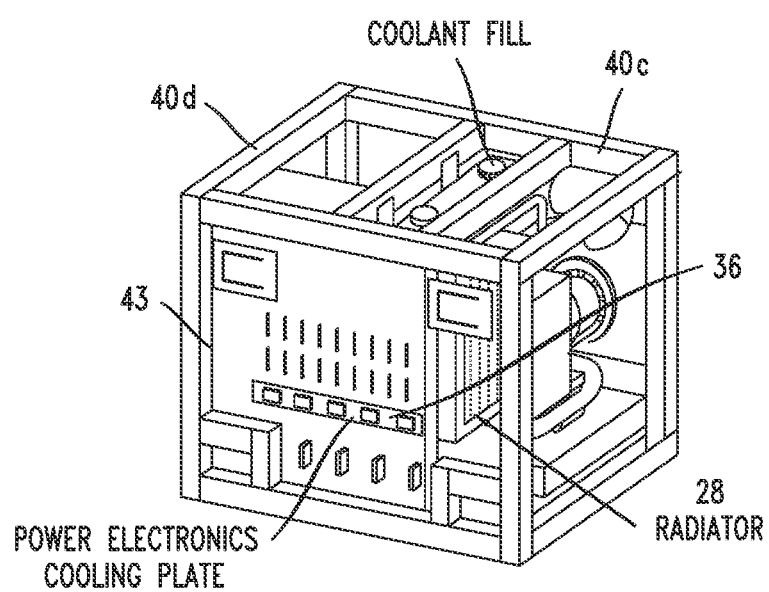

FIGS. 15a to 15C depict views of the thermal transfer structure 36. FIG. 15A depicts a view of the top of the structure 36 (facing away from electronic components 43). FIG. 15B depicts a view of the structure (facing towards the components 43) and FIG. 15C depicts a view of the structure 36 positioned on the components 43.

As shown in FIG. 15A, structure 36 may comprise a plate-like or bar-like structure. One side of the structure 36 may include a plurality of cooling fins 36a. In embodiments, as the temperature of the electronic components increases, some of the thermal energy from the components 43 may be conducted or conveyed to the structure 36, and eventually to the fins 36a. As air 41a in the cavity 46 of the system 1 flows, the air flows around and over each fin 36a, thereby removing thermal energy form each fin 36a and aiding in the cooling of the components 43.

In an embodiment, the structure 36 may also be cooled by coolant from piping 37 as shown in FIG. 2. In an embodiment the structure 36 may comprise openings 36b to receive piping 37 and any necessary fittings, for example. As the coolant flows into the structure 36 from the cooling module 35 it also flows into internal cavities of each fin 36a, thereby transferring thermal energy (heat) from each fin 36a and from the other portions and surfaces of the structure 36 as well to the coolant. Such thermal transfer functions to cool the structure 36 and aids in the cooling of the components 43.

In an embodiment, the structure 36 may be composed of 6061 T6 aluminum, to give just one example of a material that may be used as structure 36.

The inventors believe that the addition of the structure 36 and cooling loop 37a substantially reduces the temperature of the power electronics 43.

In addition to the liquid coolant, cooling loops the thermal management subsystem is also configured to provide air flow cooling. For example, in one embodiment the system 1 may include a ruggedized frame 40 that surrounds and protects the generator 2, engine 2a and other components of system 1. In one embodiment the frame 40 may include an inlet 40a to allow air outside of the frame 40 at an input temperature $T_{ambient}$ to enter into an internal cavity 46 formed by the frame 40 and an outlet 40b that allows heated air at temperature $T_{inside}$ to exit the cavity 46 in order to cool internal components of the system 1, where, in general, $T_{ambient}$ is less than $T_{inside}$ during operation of the generator 2 and engine 2a.

Once inside frame 40, the air at $T_{ambient}$ the air in the cavity may flow over (or through) generators 2,3, engine 2a, electronics 43, radiator 28, muffler 29 and is used by fans 33, 34 to cool the liquid engine coolant in loops 25a, 26a 37a and 38a as well as cool the gaseous exhaust from the engine.

Figure 3:
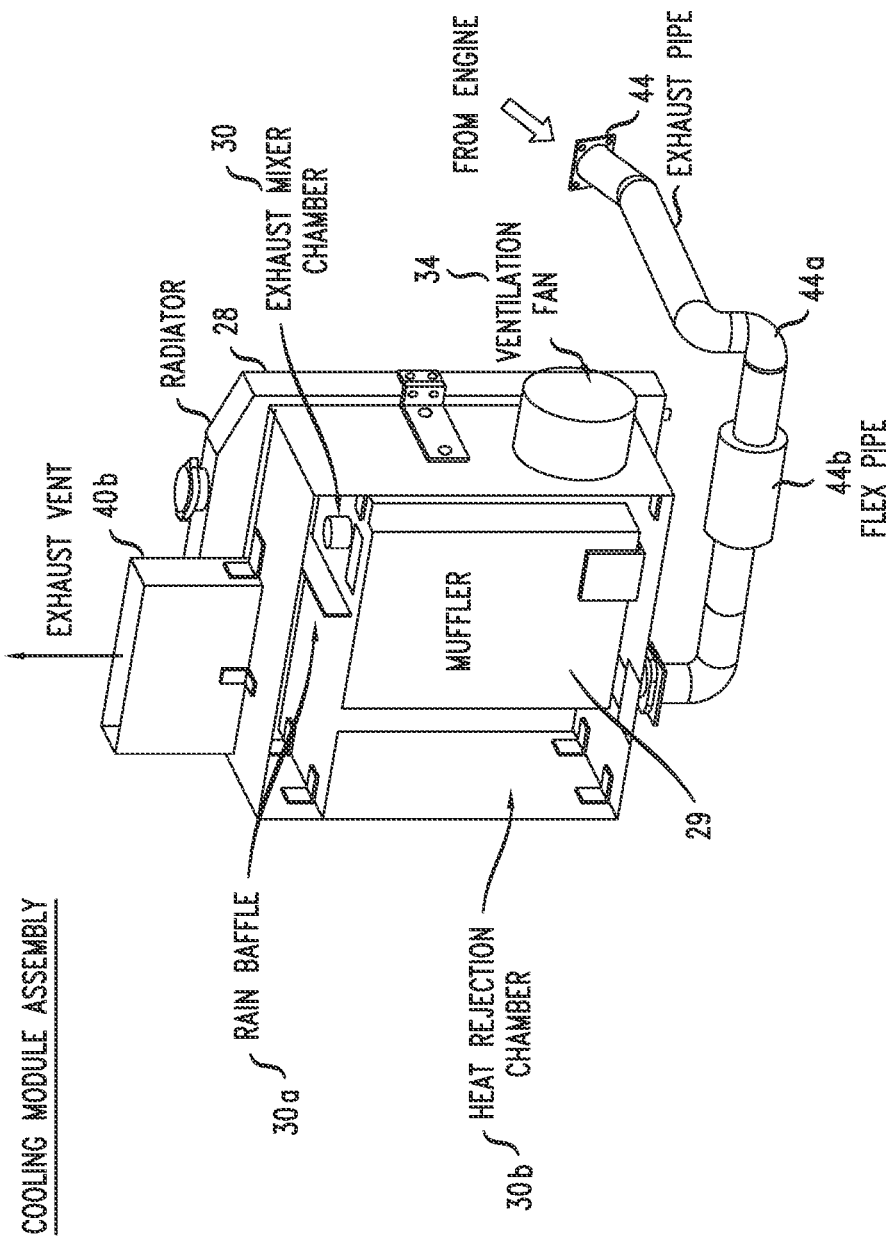
FIG. 3 depicts an exemplary configuration of a muffler, radiator and exhaust mixer according to one embodiment of the present disclosure.

In more detail, referring to FIG. 3 there is shown an exemplary configuration of the radiator 28, muffler 29 and exhaust mixer 30 that may be enclosed by a heat transfer and rejection chamber 30b. As previously explained, air at an ambient temperature $T_{ambient}$ may flow through the radiator 28 in order to cool the liquid coolant inside the radiator. Typically, the temperature $T_{radiator}$ of the subsequently heated air is above the temperature of the input air $T_{ambient}$. However, the temperature $T_{radiator}$ of the so-heated air may be typically less than the temperature $T_{muffler}$ of the exhaust gases that are typically output from the muffler 29. The inventors discovered that by mixing at least the air that has flowed over the radiator with the exhaust gases that exit the muffler 29 in the exhaust mixer 30 it was possible to reduce the temperature $T_{output}$ of the air-gas mixture that is ultimately output from the cavity 46 via outlet 40b in the frame 40.

In more detail, in an embodiment exhaust gases from the operation of the engine 2a may be expelled from the combustion chamber(s) of the engine 2a via exhaust port 44 and fed to muffler 29 via exhaust piping 44a which may comprise a portion of flexible piping 44b that is configured for vibration isolation (e.g. bellows, wire rope mounts). The exhaust gases output from the muffler 29 at the temperature $T_{muffler}$ may be input into a chamber of the exhaust mixer 30. In addition, the exhaust mixer 30 may be further configured to receive a second input of air that has flowed through the radiator 28 and has a temperature $T_{radiator}$ into its chamber. In an embodiment, the chamber of the exhaust mixer 30 may be configured and operable to mix the air that has flowed through the radiator 28 with the exhaust gases that have exited the muffler 29. The mixing of the two inputs, where the temperature $T_{radiator}$ of the second input from the radiator 28 is substantially less than the temperature $T_{muffler}$ of the gases output from the muffler 29 reduces the temperature $T_{output}$ of the air-gas mixture that is output from the cavity 46 via outlet 40b in the frame 40. In sum, the inventors discovered that the air that has flowed through the radiator 28 can be used to reduce the reduce the temperature of the exhaust gases exiting the muffler 29 in order to reduce the temperature of the air-gas mixture that is output from the cavity 46 via outlet 40b in the frame 40.

The inventors further discovered an additional configuration of the radiator 28, muffler 29 and exhaust mixer 30 that provides air flow cooling. In this embodiment, the muffler 29 may comprise one or more external surface, cooling fins and external baffles 30a that are configured to transfer energy (e.g., thermal energy) from the external surface of the muffler 29 to the air that is flowing over the baffles 30a to heat the air to a temperature $T_{muffler-skin}$. Further, the now heated air (and other air that has flowed over additional components of the system 1, such as components 43) within chamber 30b may be directed by air forced into chamber 30b by exhaust fan 34 may be operable to force air that has flowed over the muffler and other components of the system 1 (e.g., components 43) into the chamber of the exhaust mixer 30 where it may be mixed with air at that has flowed through the radiator at a temperature $T_{radiator}$. Thereafter, the now combined and mixed air at temperatures $T_{muffler-skin}$ and $T_{muffler-skin}$ may be input into the exhaust mixer 30 at a temperature $T_{combined}$. In an embodiment, the chamber of the exhaust mixer 30 may be further configured and operable to mix such a combination of heated air at a temperature $T_{combined}$ with the exhaust gases that have exited the muffler 29. The mixing of the inputs, where the temperature $T_{combined}$ is substantially less than the temperature $T_{muffler}$ of the gases output from the muffler 29 reduces the temperature $T_{output}$ of the air-gas mixture that is output from the cavity 46 via outlet 40b in the frame 40. In sum, the inventors discovered that the air that has flowed through the radiator 28 and over and through the muffler 29 (as well as other components within frame 40) may be used to reduce the temperature of the exhaust gases exiting the muffler 29 in order to reduce the temperature of the air-gas mixture that is output from the cavity 46 via outlet 40*b* in the frame 40.

Though not shown in FIG. 3, to insure that air does not escape from the chamber 30*b* via the opening in the chamber 30*b*, that allows the fan 34 to force air into the chamber 30*b*, the system 1 may include a one-way valve and/or pressure sensor. In an embodiment, the sensor may sense that pressure drop across the opening for the fan exceeds a threshold amount (e.g., a positive pressure) upon which the valve may close the opening to restrict air from within the chamber 30*b* from escaping. This may occur, for example, when the fan is in an "OFF: state or malfunctions, for example.

In addition to being a part of a thermal energy management subsystem, the muffler 29 and exhaust mixer 30 may also form a sound attenuation subsystem.

In an embodiment, the muffler 29 may further comprise an internal, shaped baffle chamber (e.g., rectangular) that includes a multi-pass perforated aluminum or shell structure that may be configured and operable to attenuate the decibel level of the exhaust gases. The reduced-decibel, exhaust gases that exit the muffler 29 may be input into the exhaust mixer 30 where they may be mixed with heated air as described above.

The external baffles 30*a* and exhaust mixer 30 may be configured to further attenuate the decibel level of the air-gas mixture that is output from the cavity 46 and muffler 29. In an embodiment, the exhaust mixer 30 may comprise a chamber for audibly mixing the exhaust gases and heated air from the cavity 46 (e.g., air that flows through the radiator 28, and through and over the muffler 29 and/or other components). Such mixing is believed to substantially reduce the decibel level of the air-gas mixture that is output from the cavity 46 via outlet 40*b*.

Figure 4:
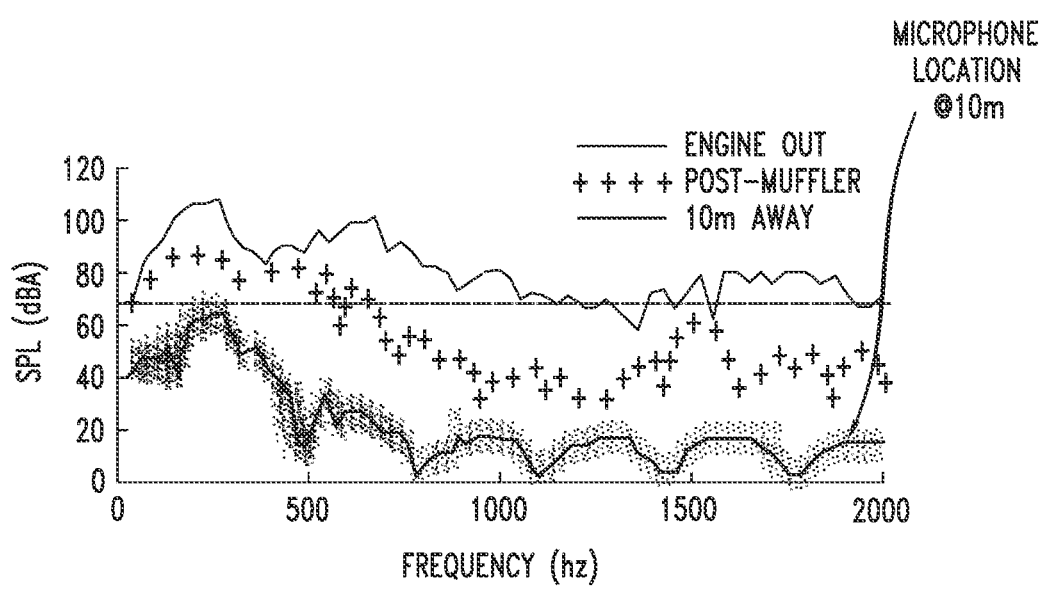
FIG. 4 depicts exemplary experimental results of sound attenuation provided by the configuration depicted in FIG. 3.

FIG. 4 depicts experimental results of the sound attenuation provided by the muffler 29 and exhaust mixer 30. In an embodiment the decibel level of the air-gas mixture output from the cavity 46 after passing through the muffler 29 and exhaust mixer 30 was less than 70 dBa for an engine, such as engine 2*a*, that was operating at 3800 RPM measured by a microphone positioned within 10 meters of the exhaust outlet 40*b*, for example.

Figure 5A:
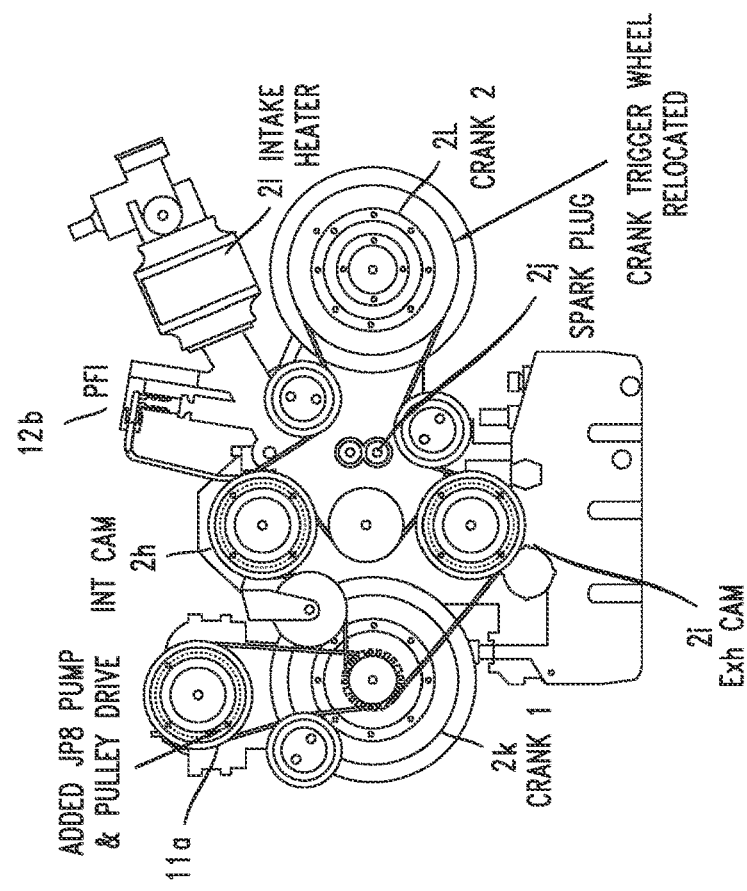
FIGS. 5A and 5B depict front and back views of an exemplary engine and generators according to one embodiment of the present disclosure.
Figure 5B:
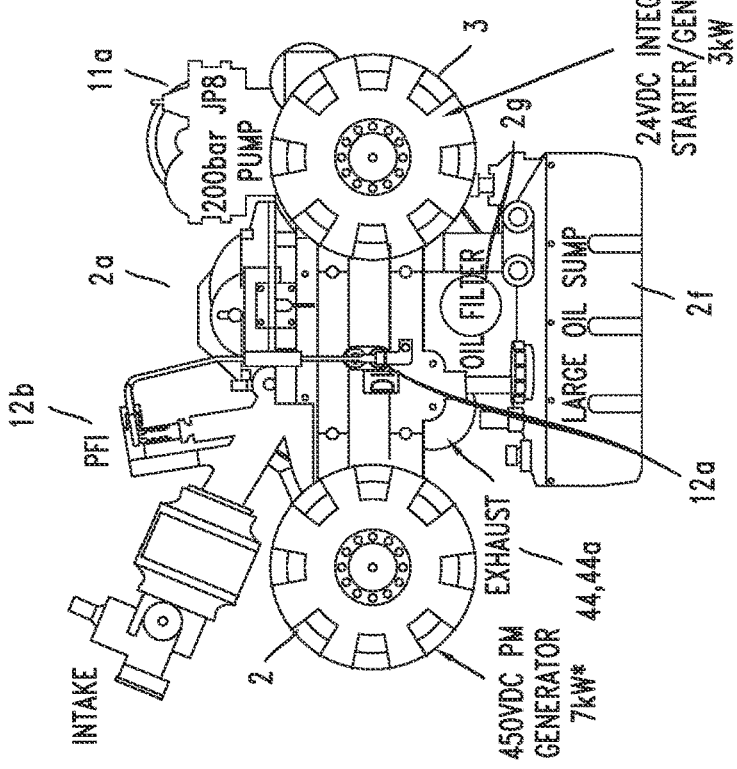

Referring now to FIGS. 5A and 5B there are depicted front and back views of an exemplary engine 2*a* and generators 2, 3 (the starter 3 may also be referred to as a low-voltage generator) that may be used with the system 1. In one embodiment the engine 2*a* may comprise an inwardly opposed piston engine or OPE operable using both gaseous fuel and/or liquid fuel types. The reader is also referred to the "253 Application" reference above for additional features of the engine 2*a*, all of which are incorporated by reference herein in full. To the extent that the present discussion of the engine 2*a* conflicts with the disclosure of the OPE in the '253 Application, the reader is advised that the present disclosure governs. However, where possible to those skilled in the art, the disclosure of the '253 Application and the present disclosure are to be interpreted as describing various different, but complimentary, features of inwardly opposed piston engines.

Though the discussion herein may use an OPE as an exemplary engine to provide energy to generators 2, 3, loads 7, paralleled system 20 and/or one or more batteries it should be understood that this is just one type of engine that may be used to power such components as well as other components of system 1.

The front view in FIG. 5A depicts the OPE engine 2*a* ("engine" hereafter), high-voltage generator 2, low-voltage generator 3, port fuel injector subsystem 12*b*, direct injection subsystem 12*a*, oil filter 2*g*, oil sump pump 2*f*, fuel pump 11*a* (for one or more types of fuel), air intake assembly 2*e* that enables a flow of combustible air into the interior of a cylinder of the engine 2*a* during an intake portion of a combustion cycle and engine exhaust assembly 44 that is operable to enable a flow of exhaust and combustion by-products out of the interior of the cylinder during an exhaust portion of the combustion cycle while the back view in FIG. 5B depicts some of the same components, and, in addition, one or more spark plugs 2*j*, crank wheels 2*k*, 2*l*, intake and exhaust cams 2*h*, 2*i*, intake air charge heater 21 (e.g., grid heater) and assorted pulleys and corresponding, connecting chains (e.g., metal chain) or belts (e.g., neoprene rubber) or gears, though it should be noted that a combination of different drive systems may also be used, including an electrical actuator depending on the requirements of a specific application.

As seen in FIGS. 5A and 5B the high-voltage generator 2 and low-voltage generator 3 may be connected to different, opposing cranks (and corresponding crankshaft). For example the high-voltage generator 2 may be directly connected to crank 2*l* while the low voltage generator 3 (used as a starter) may be directly connected to crank 2*k*, for example, without the need to use additional pulleys, brackets and/or belts. This configuration substantially reduces parasitic drag forces that may arise when such components (pulleys, brackets and/or belts) are used, thus increasing the efficiency of the system 1.

While FIGS. 5A and 5B may show one configuration of intake and exhaust assemblies, a desired number of intake and exhaust assemblies may be provided, having a desired shape and/or axial orientation with respect to each other and any desired spatial arrangement to meet the requirements of a particular engine configuration, depending on such factors as the geometry of the end-use envelope in which the engine is to be installed, and/or the air and exhaust volumetric flow rate requirements for the desired combustion reaction or cycle. Still further, the characteristics/shape/form of structures (e.g., the cylinder) surrounding the assemblies may be specified so as to enable the use of valves of a certain type or to enable the mounting of the valves at desired locations along the cylinder of the engine 2*a* to control intake and exhaust flow, and other pertinent factors. That is to say, the number, size, shape and locations of valve apertures in the assemblies may be varied and specified to meet the requirements of a particular engine design (i.e., geometry and/or operation of the OPE engine 2*a*, for example). That said, in an embodiment, both the intake and exhaust assemblies 2*e*, 44 (e.g., the valves included in such assemblies) may be configured to operate at top dead center (TDC) of the combustion cycle. Accordingly, exemplary engine 2*a* is capable of inducting air, igniting and burning fuel and expelling exhaust gases in four separate strokes and need not rely on positive pressure across the intake assembly to exhaust gases.

The intake and exhaust assemblies 2*e*, 44 may include removable intake and exhaust valve assemblies, respectively. Thus an inventive engine 2*a* need not include a typical cylinder head as in a traditional engine. This provides a number of advantages. For example, a cylinder head may function as a heat sink due to the fact that it typically comprises a large surface area and it is proximate to combustion events, thereby exposing the head to the entirety of the heart discharged by the combustion events. This typically leads to a loss of energy due to the conversion of energy form work into heat. However, because the inventive engine 2a does not use a typical cylinder head (i.e., when the engine 2a is an OPE), such losses are minimized (i.e., the inventive engine 2a converts more fuel into work and less into heat than typical, traditional engines). Further, the modular, removable valve assemblies (e.g., intake and exhaust assemblies) allow for ease of servicing, lowered production costs. In embodiments the modular intake and exhaust assemblies 2e, 44 may be directly affixed (connected) to a cylinder of the engine 2a, thus increasing the overall simplicity and practicality of the inventive engine 2a. That is to say, in general, because the inventive engine 2a does not need to incorporate a cylinder head the intake and exhaust assemblies can be directly connected to the engine block, rather than be connected to the head. As a result, the inventive engine 2a may be more compact and weigh less than traditional engines. It should be noted that intake and exhaust valve assemblies made a part of an inventive engine 2a need not necessarily be configured to be actuated in an overhead configuration. Alternatively, such valve assemblies may be actuated by a push-rod and camshaft combination, for example.

Continuing, the inventive engine 2a may comprise a four-cycle or four-stroke engine and while the figures herein may show only one cylinder of the engine 2a for clarity, it should be understood that one or more cylinders may be utilized depending on the amount of power desired to be produced by the engine 2a (e.g., two or more cylinders). That said, it should be understood that the structural arrangements and operating principles described herein may alternatively be applied to an inventive, two-stroke OPE. In an embodiment, each cylinder comprises one or more inwardly opposed pistons (see FIG. 2 of the '253 Application, elements 7a, 7b).

In embodiments of the invention, the inventive engine described herein may be configured to provide energy to a generator, such as generator 2, to output at least 5 kWe of power.

The opposed, inwardly facing pistons of the engine 2a may have predetermined lengths and predetermined diameters. In one embodiment, the stroke length of each of the opposed pistons of the engine 2a may be twice the amount of a conventional engine, for example, it being understood that the piston lengths may be geometrically determined in accordance with the piston stroke length and the lengths of apertures formed in a wall of the cylinders through which flow exhaust gases and air for combustion (e.g., see element 5a in FIG. 3C of the '253 Application).

Thus, the total difference between the spacing of the pistons at closest approach to each other (i.e., at "top dead center") and the maximum spacing of the pistons during the engine cycle (i.e., at "bottom dead center") may also be twice the amount of a conventional engine, for example.

As noted previously, the exemplary engine 2a may be a four-stroke, OPE type of engine. In an embodiment, both the intake and exhaust assemblies 2e, 44 (e.g., the vertically opposed (from a center line of a cylinder) valves included in such assemblies) may be configured to operate at top dead center (TDC) of the combustion cycle, though, as previously stated an OPE is just one type of engine that may be used to power components of system 1.

An OPE type of engine 2a can induct air, ignite and burn fuel and expel exhaust gases in four separate strokes and need not rely on positive pressure across the intake assembly to exhaust gases.

Exemplary engines 2a described herein may operate using one or more combustion modes, such as spark ignition (SI), compression (CI), SA-CI, partially-premixed combustion compression ignition (PPCI) or gasoline direct-injection compression-ignition (GCI), for example.

Referring to FIGS. 16A to 16D there are shown views of exemplary intake and exhaust valve assembly configurations of an exemplary OPE engine according to embodiments of the invention. Again, an OPE is only one type of engine that may be used with system 1. In more detail, the configurations in FIGS. 16A and 16B address the opening of the intake valve 2ee and closing of the exhaust valve 44e in such a way that their movement/position does not interfere with the movement of a piston(s).

In more detail, in an embodiment the mounting area thickness between the housing of the valve assemblies (e.g., 2ee, 44e) may be increased by an amount (e.g., 0.480 inch) according to a desired position (lobe) of a cam 2hh so that when a valve of an assembly fully opens the valve does not penetrate the inside circumference of the combustion area of the cylinder 2n.

Figure 16A:
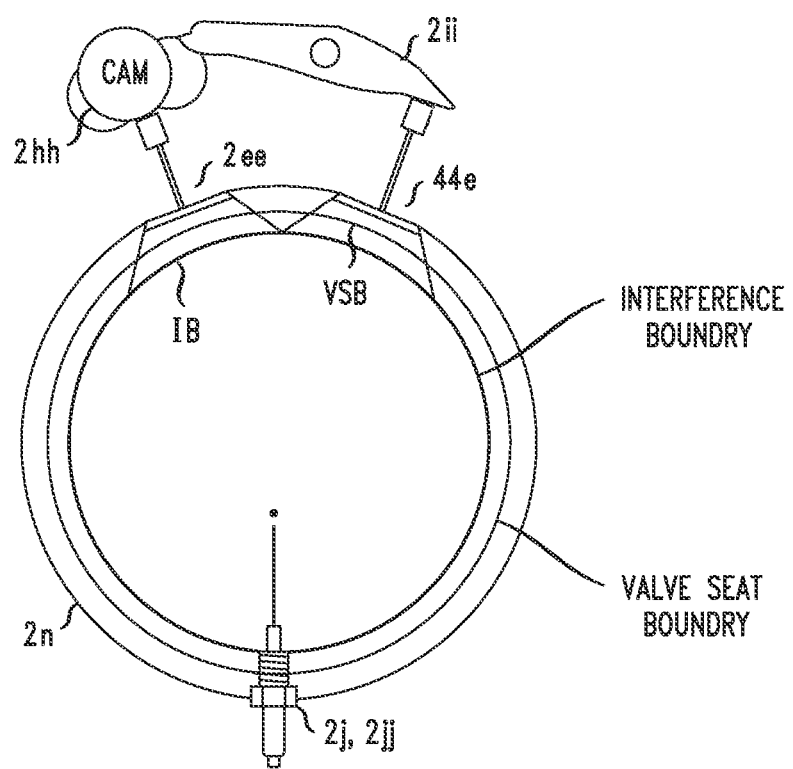
FIGS. 16A to 16D depict intake and exhaust valve configurations according to embodiments of the present disclosure.

For example, in FIG. 16A the intake and exhaust valve assemblies 2ee, 44e may be configured such that the valves 2ee, 44e are positioned on, or near, a valve seat boundary, VSB, instead of an interference boundary, IB, of the cylinder 2n such that when the piston (not shown) moves through the cylinder during a combustion cycle, the piston and valves 2ee, 44e do not interfere with one another. In this embodiment the valves may be actuated or moved using a single over-cylinder cam shaft 2hh and rocker arm 2ii.

Figure 16B:
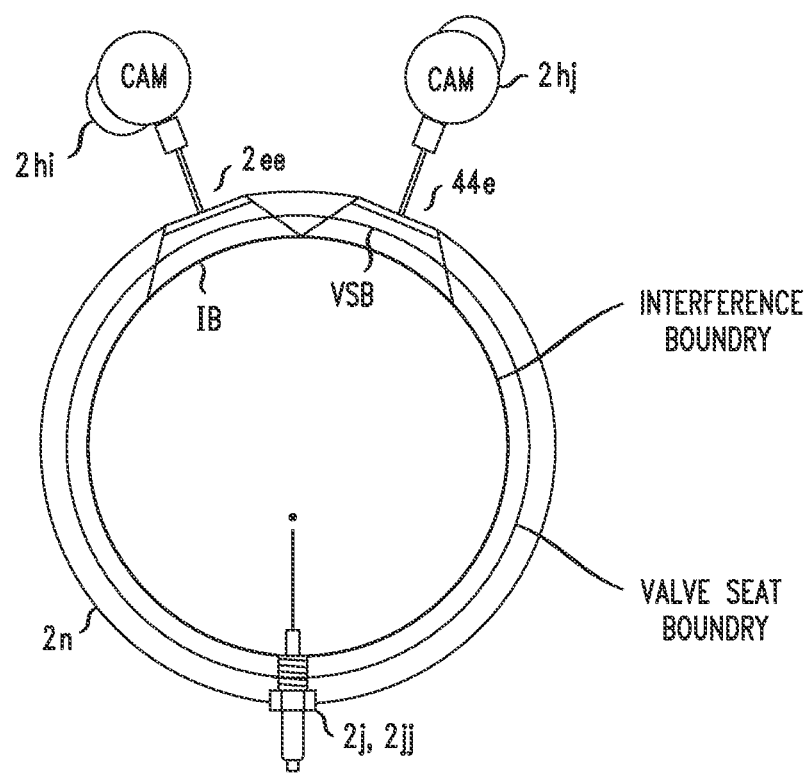

In FIG. 16B, the intake and exhaust valve assemblies 2ee, 44e may be configured such that they positioned on, or near, a valve seat boundary, VSB, instead of an interference boundary, IB, of the cylinder 2n such that when the piston (not shown) moves through the cylinder during a combustion cycle, the piston and valves 2ee, 44e do not interfere with one another. In this embodiment the valves 2ee, 44e may be individually actuated by respective cams and cam shafts 2h, 2hj (shafts are not shown for clarity).

In an embodiment, the exemplary intake valve 2ee may operate as follows. During actuation, and as the cam 2hh moves to one position (i.e., lobe), the valve 2ee may be actuated but held in a fixed position outside the interference boundary IB until a piston clears the IB. Thereafter, the valve 2ee may be fully opened as the cam 2hh moves to a second position.

As for the exhaust valve 44e, as the cam 2hh moves to a first position (i.e., lobe) the valve 44e may be retracted slightly so as not to interfere with the movement of a piston(s). Thereafter the valve 44e may be fully closed as the piston(s) reaches TDC.

The positioning of valves 2ee, 44e on the same side of the cylinder 2n as shown in FIGS. 16a and 16B allows for the positioning of the spark plug 2j, 2jj at a wide number of angles (e.g., 0 to 270 degrees).

Still further, when an exemplary engine 2a comprises multiple cylinders (e.g., 3 or more) and the cylinders are placed close to one another (e.g., side-by-side) the ability to position the spark plug 2j, 2jj at a wide range of angles may be advantageous.

Figure 16C:
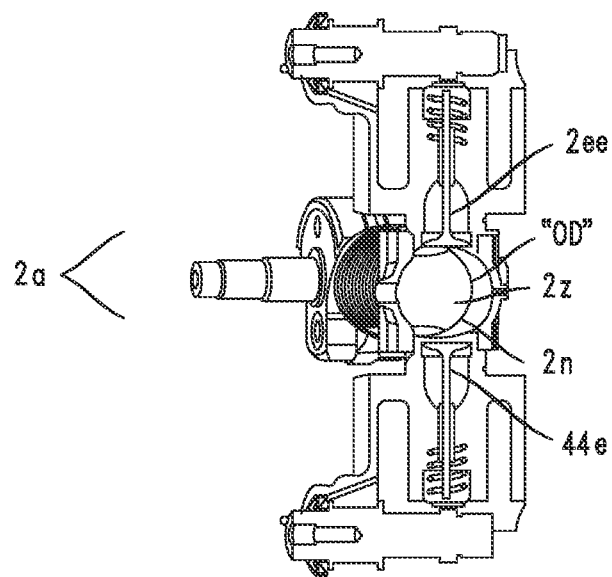
Figure 16D:
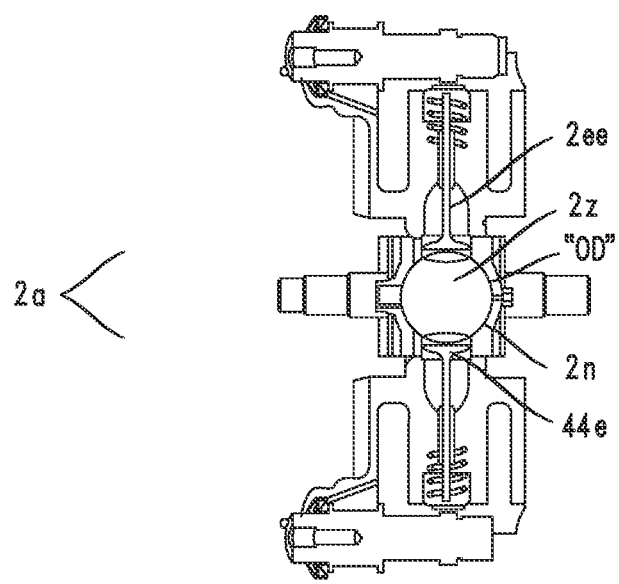

Referring now to FIGS. 16C and 16D there are shown alternative configurations of valve assembles 2ee, 44e to avoid interference with the movement of a piston(s). FIG.

16C depicts a side view of the configuration while FIG. 16D depicts a top view of the same configuration. In both figures, the valve assembles may be seated or otherwise configured such that the valves of each assembly (e.g., intake and exhaust valves) are outside the outside diameter of the cylinder 2n as the piston 2z moves inside the cylinder.

The inventors discovered a number of different engine cylinder combustion configurations that provide an appropriate fuel-air mixture that may be incorporated into the exemplary engine 2a. In embodiments, the engine 2a may include a dual Injector, fuel subsystem. More particularly, in the embodiments described herein the engine may include a port fueled injector (PFI) and a direct injector (DI) (e.g., an M6 injector) that may have one or more output nozzles. In an embodiment, the DI is configured to provide high-pressure fuel delivery. Such pressures are required to atomize one or more fuels that may be used with the system 1 (e.g., JP-8 fuel). Moreover, the fuel can be injected in a single-stage or multi-stage. Staged injection provides for the opportunity to rate shape the combustion pressures, which can lower knocking characteristics and pre-detonation. Additionally, the DI allows more control over the combustion process.

Further, in the embodiments described herein the engine 2a may include a glow plug (e.g., an M10 glow plug) and at least one spark plug (e.g., an M12 long reach spark plug) that may be positioned and mounted on a cylinder (e.g., an M5 cylinder) of the engine 2a. In those embodiments that include a long-reach spark plug (see, for example, FIGS. 6A, 6B, 8, 9 and 10) the inventors believe that the inclusion of such a spark plug with its addition length versus traditional spark plugs allows for ignition and combustion close to the center of the combustion chamber C and results in symmetrical flame propagation throughout the combustion chamber of an engine's cylinder and minimizes undesirable engine "knocking". Accordingly, in such configurations the exemplary engine 2a may comprise one or more cylinders, where each cylinder comprises at least one long-reach spark plug for ignition and combustion close to a center of a combustion chamber C of each cylinder.

One or more of the glow plug, spark plug and DI injector may be positioned on the central perpendicular axis ("central axis") of an engine's cylinder and/or may be positioned at an angle from the central axis of the cylinder based on the (i) cone angle and fuel spray pattern of the direct injector, (ii) air flow, (iii) turbulence in the combustion chamber, and (iv) the presence of staged injection.

In more detail, at temperatures below an ambient operating temperature, the temperatures and pressures required for combustion may be lacking. Accordingly, in an embodiment the engine 2a may include a glow plug in each of the engine cylinder configurations. More particularly, the glow plug may be configured as a compact structure and may be operable to output heat. Further, exemplary glow plugs described herein may be operate using a 12 volt (V) power supply (not shown in figures) and may be controlled by the electronic control unit 13.

Continuing, an exemplary glow plug and at least one exemplary spark plug may be mounted based on the fuel spray pattern of the direct injector to provide ignition, especially under cold start conditions (i.e., temperatures that are below an engine's optimum operating temperature, e.g., below an ambient temperature, or an engine that has been inactive or abandoned for a significant amount of time such as weeks, months, years or even decades). The glow plug and spark plug may be positioned to create rich pockets of fuel around the spark plug and glow plug to initiate combustion under such conditions.

In some engine cylinder configurations discussed herein, a spark plug may be positioned at a position that is above the center axis of a cylinder while a glow plug may be configured at a position below the center axis. The inventors believe that mounting the spark plug away from the center axis of the cylinder may improve the ability of the engine to be cooled due to a reduction in flame propagation and an expected combustion rate when compared to a spark plug that may be configured along the center axis. Conversely, when faster combustion times are required or desired it may be advantageous to position the spark plug along the center axis of a cylinder.

Figure 6B:
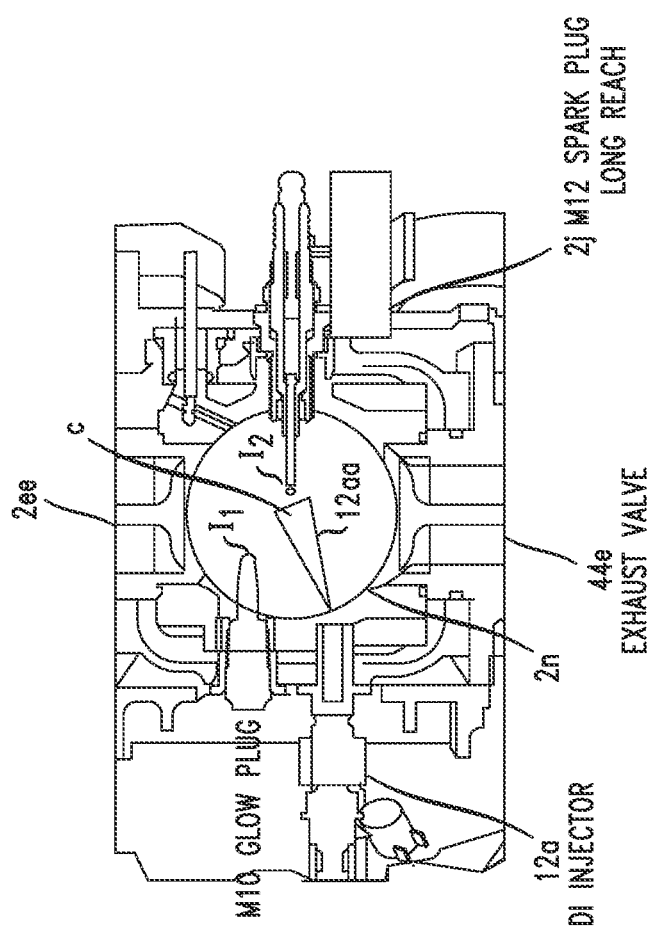
FIGS. 6A and 6B depict an exemplary engine cylinder configuration according to one embodiment of the present disclosure.
Figure 6A:
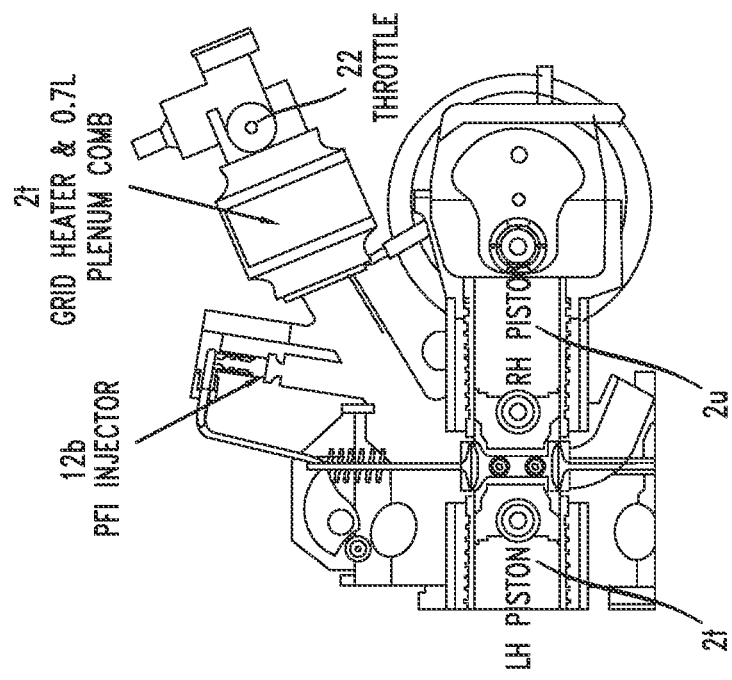

Referring now to FIGS. 6A and 6B, there is depicted one such configuration of the engine 2a. In an embodiment, the engine 2a may comprise a dual Injector, fuel subsystem. In this embodiment, the first fuel injector may be a PFI 12b while the second fuel injector 12a may be a DI (e.g., M6 injector). Also shown in FIG. 6B is a spark plug 2j and glow plug 2m for igniting the fuel (e.g., JP-8 fuel) injected by injectors 12a, 12b mixed air in the main chamber C, where in this embodiment the DI 12a and glow plug 2m may be configured (i.e., positioned and mounted) on one side of the cylinder 2n (e.g., an M5 cylinder) and the spark plug 2j may be configured on the opposite side of the cylinder 2n. In an embodiment, the spark plug 2j may be configured along the center axis of the cylinder 2n to provide faster combustion as compared to configuring the spark plug at an angle from such a central axis. In an embodiment, the spark plug 2j may comprise an M12 long reach spark plug, for example while the glow plug 2m may comprise an M10 glow plug to name two exemplary examples of such components. In an embodiment, the glow plug 2m may be energized when it is necessary to ignite the fuel under "cold start" conditions in conjunction with the operation of the heater 21. During cold start conditions the fuel spray from the DI 12a (from one or more of the DI's 12a nozzles) onto the spark plug 2j and glow plug 2m is believed to create concentrated pockets of fuel around the plugs. These concentrated or rich pockets of fuel are believed to promote the combustion process during cold start conditions. Conversely, during hot start conditions, the glow plug 2m may be de-energized (i.e., turned off) and combustion will be initiated by the spark plug 2j. The inventors discovered that such a configuration provided a sufficient fuel mixture needed to start the engine 2a under cold-start conditions while providing sufficient power when the engine 2a is connected to one or more loads 7 with reduced engines knocking.

In this embodiment, fuel from the PFI 12a and DI 12a may be injected into the combustion chamber C. As the fuel begins to vaporizes, the fuel (and compressed air) may be ignited by the tip of the glow plug 2m and/or spark plug 2j as required at respective ignition zones $I_1$, $I_2$ for example.

Figure 7B:
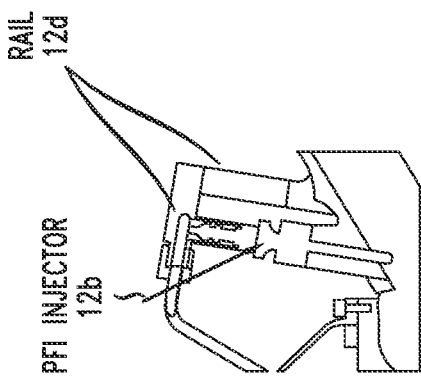
FIGS. 7A to 7C depict views of an exemplary fuel delivery subsystem according to one embodiment of the present disclosure.
Figure 7C:
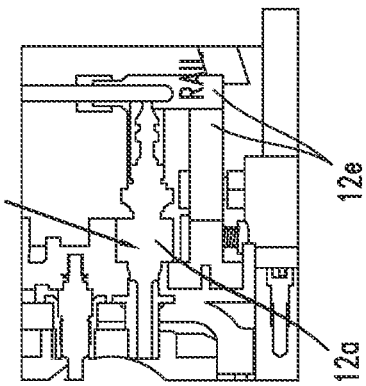
Figure 7A:
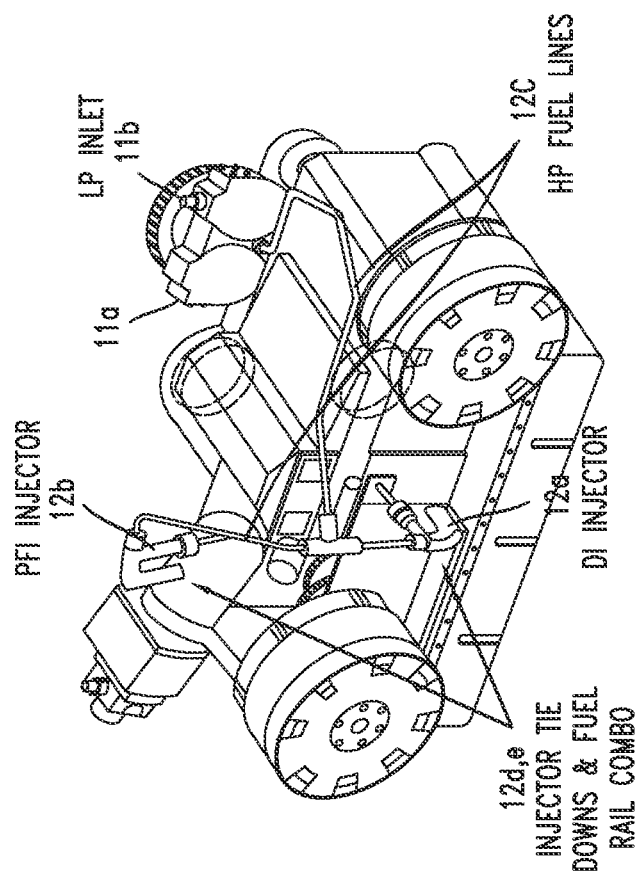

FIGS. 7A to 7C depicts views of an exemplary fuel delivery subsystem. As shown in FIG. 7A, fuel 11 at one pressure (e.g., a low pressure) may be input into a fuel pump 11a at inlet 11b. The pump 11a may be operable to increase the pressure of the fuel to and deliver the fuel at an increased pressure (e.g., a high pressure) to the DI 12a and PFI 12b via high pressure fuel lines 12c.

Referring now to FIGS. 7B and 7C, each of the fuel injectors 12a, 12b may be securely connected to the engine 2a by exemplary injector tie downs and fuel rail structures. FIG. 7B depicts a view of the tie downs and rail 12d for the PFI 12b while FIG. 7C depicts a view of the exemplary tie downs and rail 12e for the PFI 12a.

It should be understood, however, that the engine cylinder configuration shown in FIGS. 6A, 6B and 7A to 7C excludes the positioning of vertically opposed (from a center line of a cylinder) intake and exhaust valves for the sake of clarity. Further, it should be understood that the engine cylinder configuration shown in FIGS. 6A, 6B and 7A to 7C is only one exemplary engine cylinder configuration of the spark plug, glow plug and injectors. FIGS. 8 through 12 depict additional exemplary engine cylinder configurations for exemplary spark plug, glow plug and injectors, among other engine components where, again, these configurations exclude the positioning of intake and exhaust valves for the sake of clarity. Unless otherwise stated, the engine cylinder configurations set forth in FIGS. 8 to 12 may comprise the same type of cylinders, injectors, glow plugs and spark plugs as indicated previously.

Figure 8:
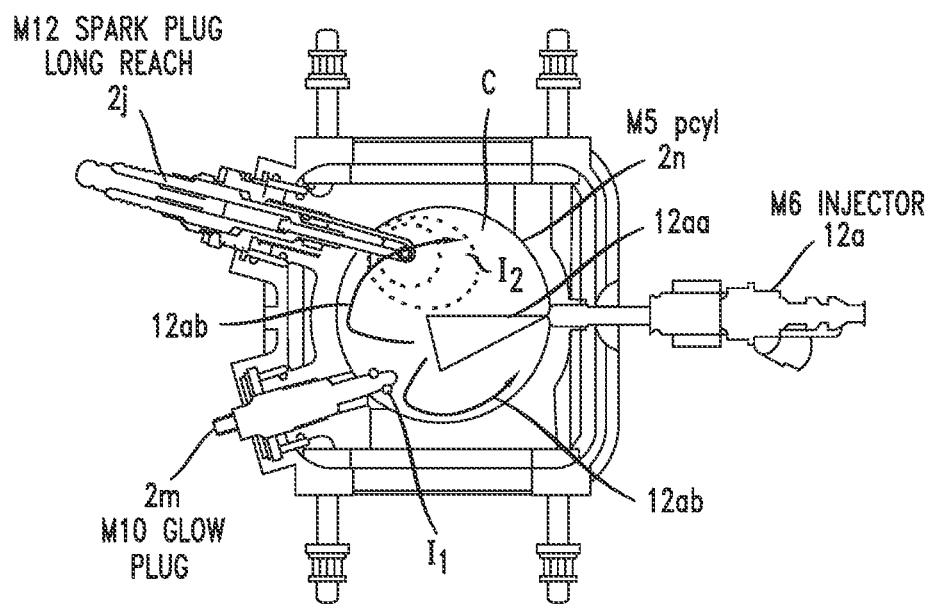
FIGS. 8 to 12 depict views of additional, exemplary engine cylinder configurations according to embodiments of the present disclosure.

In the exemplary configuration shown in FIG. 8, both the spark plug 2*j* and glow plug 2*m* may be positioned on the same side of the cylinder 2*n*—on a side opposite the DI 12*a*. As before, fuel from the DI 12*a* (from one or more of the DI's 12*a* nozzles) may be direct injected into the combustion chamber C. As the fuel is injected it begins to vaporize. In this embodiment, the DI 12*a* may be configured at an angle such that the fuel spray 12*aa* from one or more of the DI's 12*a* nozzles may be slightly directed towards the glow plug 2*m*. In an embodiment, the so configured DI 12*a* allows some fuel (e.g., liquid fuel) within fuel spray 12*aa* to land on a tip of the glow plug 2*m* to provide ignition at zone $I_1$, for example, of the fuel by the glow plug 2*m* during cold start conditions, for example.

The fuel from the DI 12*a* may also travel towards the circumference of cylinder liner (see exemplary path 12*ab*) so that the fuel may be re-directed across the spark plug 2*j* for additional ignition at zone $I_2$, for example. In an embodiment, a flame from the spark plug ignition may propagate symmetrically across the combustion chamber C.

Figure 9:
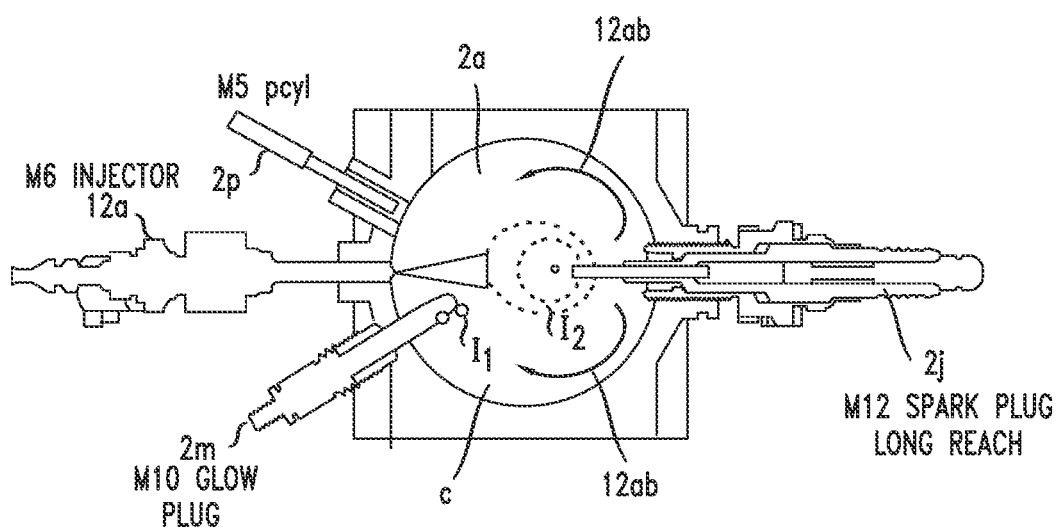

In the exemplary configuration shown in FIG. 9, the spark plug 2*j* and glow plug 2*m* may be positioned on opposite sides of the cylinder 2*n*. Further both the spark plug 2*j* and DI 12*a* may be positioned on the central axis of the cylinder on opposing sides of the cylinder. In this configuration the engine 2*a* may also include a pressure sensor 2*p* (e.g., transducer) for monitoring the pressure within the combustion chamber C of the cylinder 2*n*.

As before, fuel from one or more of the DI's 12*a* nozzles may be direct injected into the combustion chamber C. As the fuel is injected it begins to vaporize. In this embodiment, because the DI 12*a* may be configured along the central axis of the cylinder 2*n*, the fuel spray 12*aa* from one or more of the DI's 12*a* nozzles may be directed towards the glow plug 2*m*, allowing fuel (e.g., liquid fuel) within fuel spray 12*aa* to land on a tip of the glow plug 2*m* to provide ignition of the fuel at zone $I_1$ along with mixed air in the main chamber C, for example, by the glow plug 2*m* during cold start conditions, for example. The fuel from the DI 12*a* may also travel towards the circumference of cylinder liner (see exemplary path 12*ab*) so that the fuel may be directed and re-directed across the spark plug 2*j* for additional ignition at zone $I_2$ along with mixed air in the main chamber C, for example. In an embodiment, a flame from the spark plug ignition may propagate symmetrically across the combustion chamber C.

Figure 10:
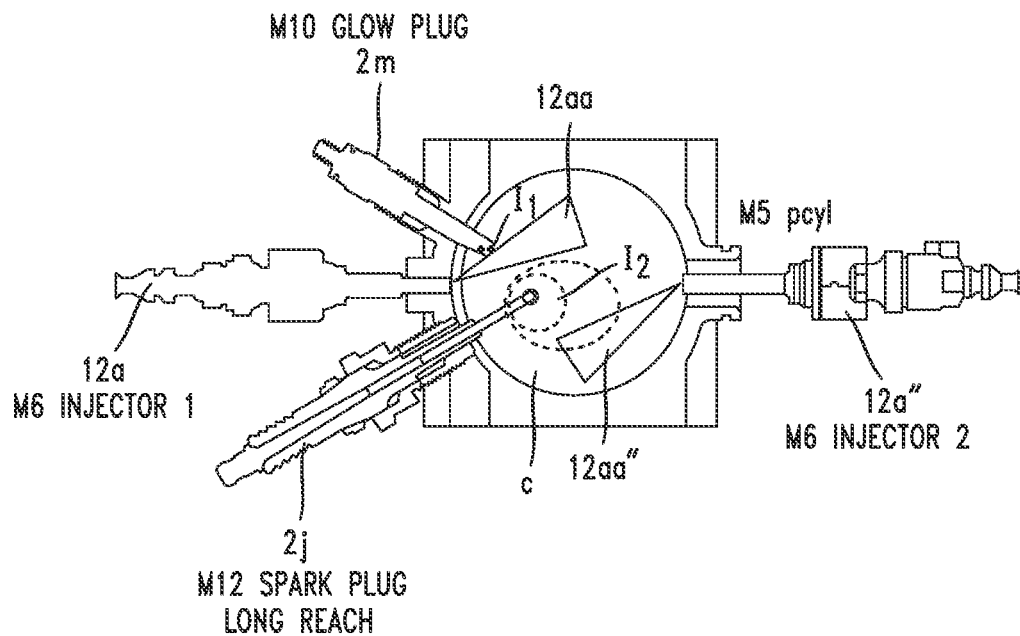

In the exemplary configuration shown in FIG. 10, the spark plug 2*j* and glow plug 2*m* may be positioned on the same sides of the cylinder 2*n*. Further, this configuration includes two DI injectors 12*a*, 12*a*" each positioned on opposite sides of the cylinder 2*n* along the central axis of the cylinder 2*n*. In this embodiment, as fuel is injected into the combustion chamber C by the injectors 12*a*, 12*a*" the fuel begins to vaporize and may be ignited by the tip of the glow plug 2*m* at respective ignition zone $I_1$ and by spark plug 2*j* at respective ignition zone $I_2$, for example. In more detail, the first injector 12*a* may be configured such that fuel spray 12*aa* from one or more of its nozzles is directed at an angle towards the glow plug 2*m* while the second injector 12*a* may be configured such that fuel spray 12*aa*" from one or more of its nozzles is directed at an angle towards the spark plug 2*j*. In addition, fuel spray from both injectors 12*a*, 12*a*" may also travel towards the circumference of cylinder liner so that the fuel may be directed and re-directed across the spark plug 2*j* for additional ignition at zone $I_2$, for example. In an embodiment, a flame from the spark plug ignition may propagate symmetrically across the combustion chamber C. Still further, the fuel injected by both injectors 12*a*, 12*a*" may generate tumbling fuel about the center axis of the cylinder 2*n* which is believed by the inventors to promote higher turbulent kinetic energy which, in turn, promotes faster flame propagation and combustion.

Figure 11:
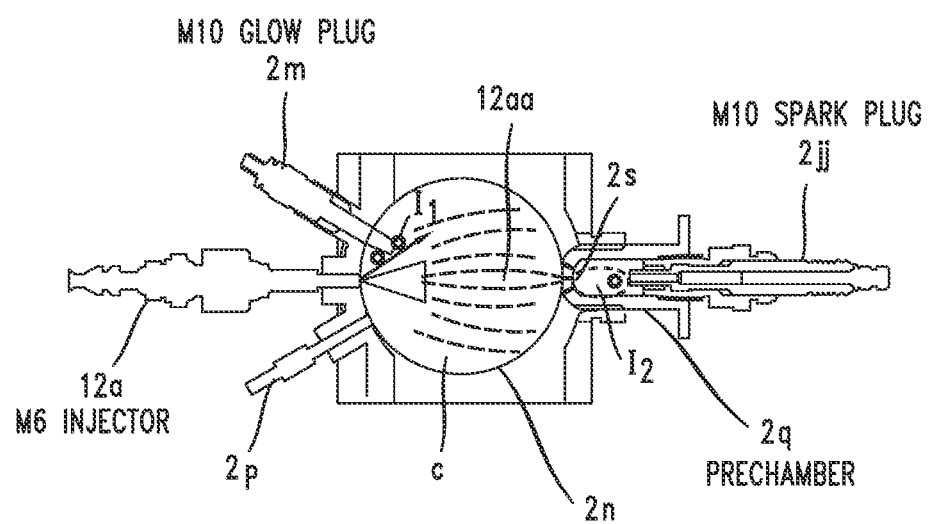

The exemplary configuration shown in FIG. 11 includes a pre-chamber 2*q* configured to receive a spark plug 2*jj* (e.g., an M10 spark plug). In this embodiment the glow plug 2*m* may be positioned on the opposite side of the cylinder 2*n* as the spark plug 2*jj* but on the same side as the DI 12*a*. Further, the spark plug 12*jj* and pre-chamber 2*q* may be aligned on opposite sides of the cylinder as the DI 12*a*, all three components being aligned along a central axis of the cylinder 2*n*. This configuration may also include a pressure sensor 2*p* (e.g., transducer) for monitoring the pressure within the combustion chamber C of the cylinder 2*n*.

In an embodiment, fuel from the DI 12*a* may be direct injected into the combustion chamber C. As the fuel is injected it begins to vaporize. In this embodiment, the DI 12*a* may be configured such that the fuel spray 12*aa* from one or more of its nozzles may be slightly directed towards the glow plug 2*m*. In an embodiment, the so configured DI 12*a* allows some fuel (e.g., liquid fuel) within fuel spray 12*aa* to land on a tip of the glow plug 2*m* to provide ignition at zone $I_1$, for example, of the fuel by the glow plug 2*m* during cold start conditions, for example. The fuel from the DI 12*a* may also travel towards, and be received into, the pre-chamber 2*q*. In addition, heated air may be compressed by the action of the opposed pistons (not shown in figures) and be received into the pre-chamber 2*q* where the entrapped fuel and air may be ignited by the spark plug 2*jj* at zone $I_2$, for example. In an embodiment, the pre-chamber 2*q* may function as a secondary combustion chamber. The combustion of the fuel-air mixture within the pre-chamber 2*q* may generate an increase in pressure that forces a heated, turbulent flow of the ignited fuel-air mixture (e.g., a heated jet-shaped flow) out of the nozzle 2*s* of the pre-chamber 2*q* towards the center of the main or primary combustion chamber C of the cylinder 2*n*. The heated, turbulent flow moves very fast to ignite the fuel-air mixture in the main chamber C when compared to the time it takes to ignite fuel in the combustion chambers in configuration that may incorporate flush mounted spark plugs or extra-long reach spark plugs. The resulting flame propagates symmetrically across the combustion chamber C. In an embodiment. Still further, the combination of a pre-chamber 2*q* and embedded spark plug 2*jj* as shown in FIG. 11 is believed to reduce engine knocking in the main chamber C and improve the knock margin while operating the combustion phasing closer to maximum brake torque (MBT) timing.

An exemplary engine that includes the configuration shown in FIG. 11 may be referred to as a lean burn engine having a Lambda value of less than 1.50, for example. This will enable the combustion process to operate at higher loads more consistently under lean burn conditions (Lambda<1.5).

Figure 12:
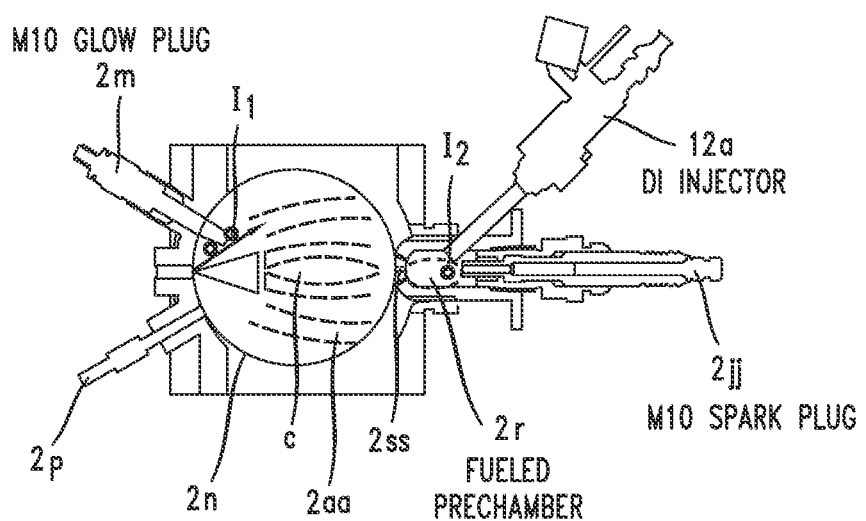

Referring to FIG. 12, there is shown yet another exemplary, engine cylinder configuration for the engine 2a. This configuration includes a pre-chamber 2r configured to receive a DI 12a and a spark plug 2jj (e.g., an M10 spark plug). In this embodiment a glow plug 2m may be positioned on the opposite side of the cylinder 2n from the spark plug 2jj and DI 12a. Further, the spark plug 12jj and pre-chamber 2r may be aligned along a central axis of the cylinder 2n. In this configuration the engine 2a may also include a pressure sensor 2p (e.g., transducer) for monitoring the pressure within the combustion chamber C of the cylinder 2n.

In an embodiment, fuel from the DI 12a may be direct injected into the pre-chamber 2r. As the fuel is injected it begins to vaporize and is ignited by the spark plug 2jj within the pre-chamber 2r at zone $I_2$, for example. In an embodiment, the pre-chamber 2r may function as a secondary combustion chamber. The combustion of the fuel-air mixture within the pre-chamber 2r may generate an increase in pressure that creates a heated, turbulent flow of the ignited fuel-air mixture (e.g., a heated jet-shaped flow) which is forced out of the nozzle 2ss of the pre-chamber 2r towards the center of the main or primary combustion chamber C of the cylinder 2n. The heated, turbulent flow ignites the fuel-air mixture in the main chamber C. The resulting flame propagates symmetrically across the combustion chamber C. An exemplary engine that includes the configuration shown in FIG. 11 may be referred to as an ultra-lean burn engine having a Lambda value of substantially less than 1.50, for example, even less than the configuration in FIG. 11 because it is expected that less fuel may be needed to create combustion in the main chamber C. Accordingly, an engine 2a that incorporates the configuration shown in FIG. 12 may provide an increase in fuel efficiency with lower emissions versus the other configurations described herein.

Similar to the configuration in FIG. 11, the combination of a pre-chamber 2r and embedded spark plug 2jj and DI 12a in FIG. 12 is believed to reduce engine knocking in the main chamber C and improve the knock margin while operating the combustion phasing closer to maximum brake torque (MBT) timing. Further, the configuration in FIG. 12 is believed by the inventors to result in improved brake thermal efficiency and very low NOx emissions.

The components installed in each of the engine cylinder configurations in FIG. 6A to 12 may be configured to be positioned within one or more sized openings in the cylinder 2n. For example, in an embodiment a spark plug may be positioned within an opening that is sized for a glow plug, or vice-versa. To allow for such interchangeability of components within different sized openings of the cylinder the inventors provide one or more adaptors that may be used to connect a spark plug or glow plug to a sized opening in a cylinder 2n.

Figure 13A:
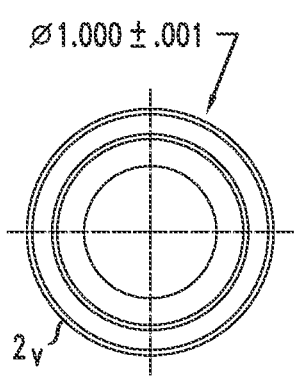
FIGS. 13A to 13C depict different views of an exemplary adaptor that may be used to connect one or more different components to the cylinder of an exemplary engine according to embodiments of the present disclosure.
Figure 13B:
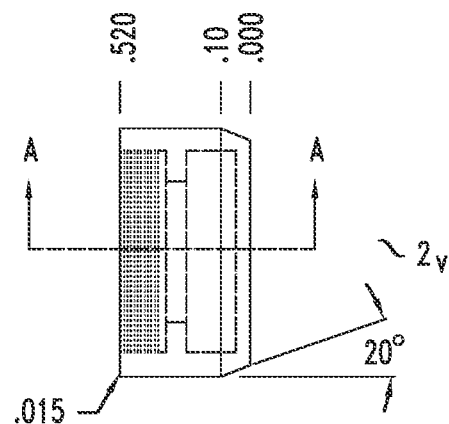
Figure 13C:
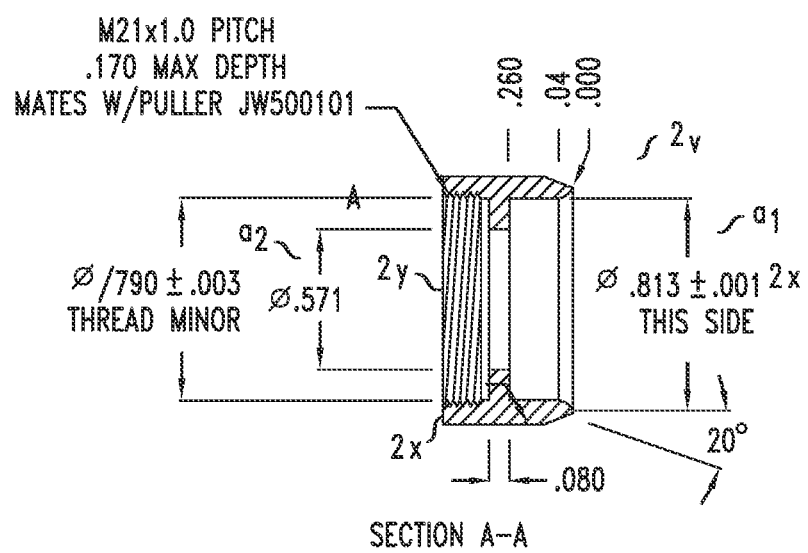

Referring now to FIGS. 13A to 13C there is depicted different views of an exemplary adaptor 2v. In an embodiment, the adaptor 2v may have a first opening in a first end $a_1$ whose diameter is sized to fit within an opening of the cylinder and a second opening in a second end $a_2$ whose diameter differs from the first opening and is sized to receive spark plug or glow plug whose diameter is larger (or smaller) than the opening of the cylinder. Further, the exemplary adaptor 2v may include threads 2y to threadably receive a correspondingly threaded spark plug, pressure transducer or glow plug, (e.g., those described elsewhere herein), for example. Still further, in one embodiment the end $a_1$ of the adaptor 2v that is fit into an opening of the cylinder 2n may comprise a compressible or deformable structure 2x that is configurable to deform or compress in order to fit within the dimensions of one or more different sized openings in the cylinder of an engine. Thus, the adaptor 2v can be said to fit with one or more different sized openings of a cylinder of an engine, such as engine 2a.

The claim language that follows below is incorporated herein by reference in expanded form, that is, hierarchically from broadest to narrowest, with each possible combination indicated by the multiple dependent claim references described as a unique standalone embodiment.

While benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

We claim:

1. A compact and ruggedized system for producing power comprising:
a first generator;
a second generator;
an engine connected to the first and second generators to provide energy to the first and second generators, the engine comprising one or more cylinders, where each cylinder comprises,
a long-reach spark plug for ignition and combustion close to a center of a combustion chamber of each cylinder,
a glow plug,
at least one direct injector configured to inject fuel towards the glow plug and into the combustion chamber.

2. The system as in claim 1 wherein the first generator outputs at least 5 kWe of power.

3. The system as in claim 1 further comprising a second direct injector configured to inject fuel towards into the combustion chamber and towards the spark plug, wherein the fuel injected by the at least one injector and the second injector generates tumbling fuel about a center axis of each cylinder.

4. The system as in claim 1 wherein the engine comprises an inwardly opposed piston engine.

5. A compact and ruggedized system for producing power comprising:
a first generator;
a second generator;
an engine connected to the first and second generators to provide energy to the first and second generators, the engine comprising one or more cylinders, where each cylinder comprises,
at least one direct injector configured to inject fuel towards a glow plug and towards a pre-chamber,
the pre-chamber configured to receive at least one spark plug for igniting the fuel from the direct injector, and
a glow plug for igniting fuel from the direct injector.

6. The system as in claim 5 wherein the first generator is configured to output at least 5 kWe of power.

7. The system as in claim 5 wherein the engine comprises an inwardly opposed piston engine.

8. A compact and ruggedized system for producing power comprising:
- a first generator;
- a second generator;
- an engine connected to the first and second generators to provide energy to the first and second generators, the engine comprising one or more cylinders, where each cylinder comprises,
  - a pre-chamber configured to receive a direct injector configured to inject fuel into the pre-chamber and further configured to receive at least one spark plug for igniting the fuel from the direct injector in the pre-chamber and creating a heated turbulent flow out of the pre-chamber and into the combustion chamber of the cylinder to ignite fuel in the combustion chamber, and
  - a glow plug for igniting fuel from the direct injector.

9. The system as in claim 8 wherein the first generator is configured to output at least 5 kWe of power.

10. The system as in claim 8 wherein the engine comprises an inwardly opposed piston engine.

\* \* \* \* \*

UNITED STATES PATENT AND TRADEMARK OFFICE
CERTIFICATE OF CORRECTION

| | |
|---|---|
| PATENT NO. | : 11,795,866 B2 |
| APPLICATION NO. | : 17/696834 |
| DATED | : October 24, 2023 |
| INVENTOR(S) | : Gregory Powell et al. |

It is certified that error appears in the above-identified patent and that said Letters Patent is hereby corrected as shown below:

In the Specification

Column 1 Kindly amend the first four lines as follows:
GOVERNMENT RIGHTS
The inventive disclosures herein were made with U.S. government support under Contract Number W15P7T-19-D-0157 awarded by the United States Department of Defense. The U.S. government has certain rights in the inventive disclosures.

Signed and Sealed this
First Day of October, 2024

Katherine Kelly Vidal
*Director of the United States Patent and Trademark Office*